US008621286B2

(12) United States Patent
Ozawa

(10) Patent No.: US 8,621,286 B2
(45) Date of Patent: Dec. 31, 2013

(54) FAULT INFORMATION MANAGING METHOD AND FAULT INFORMATION MANAGING PROGRAM

(75) Inventor: Kimio Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 108 days.

(21) Appl. No.: 13/248,475

(22) Filed: Sep. 29, 2011

(65) Prior Publication Data

US 2012/0084615 A1   Apr. 5, 2012

(30) Foreign Application Priority Data

Sep. 30, 2010   (JP) .................................. 2010-221005

(51) Int. Cl.
*G06F 11/00*   (2006.01)
(52) U.S. Cl.
USPC .......................................................... 714/48
(58) Field of Classification Search
USPC .......................................... 714/47.1, 746, 48
See application file for complete search history.

(56) References Cited

U.S. PATENT DOCUMENTS

| 8,484,512 | B2* | 7/2013 | Manning et al. ................. 714/18 |
| 2005/0160335 | A1* | 7/2005 | Peterson ........................ 714/724 |
| 2007/0067585 | A1* | 3/2007 | Ueda et al. ..................... 711/162 |
| 2007/0112671 | A1* | 5/2007 | Rowan ............................ 705/39 |
| 2007/0223917 | A1* | 9/2007 | Nagamine ......................... 398/1 |
| 2010/0204960 | A1* | 8/2010 | Hagadone et al. ............ 702/188 |

FOREIGN PATENT DOCUMENTS

| JP | 9-64829 A | 3/1997 |
| JP | 2000331266 A | 11/2000 |

* cited by examiner

*Primary Examiner* — Yair Leibovich

(57) ABSTRACT

To save the records of an instant fault generation history and an instant fault recovery history without omission, and to pursue the cause of the fault that causes data error and the like as well as to perform recovery works and the like accurately. Each of fault generation notifications transmitted from main signal packages are stored to an instant fault generation history table provided to a storage module of a monitoring control package along a time series cyclically without exception, and each of fault recovery notifications transmitted in accordance with a detection of recovery of the fault corresponding to each of the stored fault generation notifications is stored to the instant fault generation history storage table by corresponding to each of the fault generation notifications already stored to the instant fault generation history storage table.

7 Claims, 14 Drawing Sheets

FIG. 9

| j | PACKAGE NAME | ALARM GENERATION HISTORY | ALARM RECOVERY HISTORY |
|---|---|---|---|
| 1 | 103a | A1 | A1' |
| 2 | 103b | B1 | B1' |
| 3 | 103a | C1 | C1' |
| ⋮ | ⋮ | ⋮ | ⋮ |
| N | 103b | Q1 | Q1' |

| i | R(I) | F(I) |
|---|------|------|
| 1 | X1 | 0 |
| 2 | X2 | 0 |
| 3 | X3 | 0 |
| 4 | ⋮ | 1 |
| ⋮ | ⋮ | ⋮ |
| M | XM | 0 |

FAULT INFORMATION MANAGING METHOD AND FAULT INFORMATION MANAGING PROGRAM

CROSS-REFERENCE TO RELATED APPLICATION

This application is based upon and claims the benefit of priority from Japanese patent application No. 2010-221005, filed on Sep. 30, 2010, the disclosure of which is incorporated herein in its entirety by reference.

BACKGROUND OF THE INVENTION

1. Field of the Invention

The present invention relates to improvements of a fault information managing method and a fault information managing program for a trunk transmission device which includes main signal packages for each device for detecting a fault generated in each device as well as recovery of the fault and transmitting a fault generation notification and a fault recovery notification to a monitoring control package and includes the monitoring control package which receives the fault generation notification and the fault recovery notification from each of the main signal packages and transmits at least a part thereof to a master device.

2. Description of the Related Art

As the trunk transmission device which includes the main signal packages for each device for detecting a fault generated in each device as well as recovery of the fault and transmitting a fault generation notification and a fault recovery notification to the monitoring control package and includes the monitoring control package which receives the fault generation notification and the fault recovery notification from each of the main signal packages and transmits at least a part thereof to a master device, the trunk transmission device as shown in FIG. 13 is already well-known.

This trunk transmission device 100 includes: main signal packages 103a, 103b, - - - for each of devices 102a, 102b, - - - which detect a fault generated in each of the devices 102a, 102b, - - - as the targets of control as well as recovery of the fault and transmit a fault generation notification and a fault recovery notification to a monitoring control package 101; and the monitoring control package 101 which receives the fault generation notification and the fault recovery notification from each of the main signal packages 103a, 103b, - - - and transmits at least a part thereof to a master device 104 such as a user terminal or a master monitoring system.

A microprocessor 105 of the monitoring control package 101 and microprocessors 106a, 106b, - - - of each of the main signal processors 103a, 103b, - - - are connected to be able to transmit information mutually via an in-device bus 107 of the microprocessor 105 and in-device buses 108a, 108b, - - - of the microprocessors 106a, 106b, - - - . Further, the microprocessor 105 of the monitoring control package 101 and a microprocessor of the master device 104 are connected mutually to be able to transmit information via an interface 109 used for outside the device.

The microprocessor 105 of the monitoring control package 101 includes a storage module 110 constituted with a ROM, a RAM, and a nonvolatile memory. Further, the microprocessors 106a, 106b, - - - of the main signal packages 103a, 103b, - - - also include storage modules 111a, 111b, - - - each being constituted with a ROM, a RAM, and a nonvolatile memory.

The storage modules 111a, 111b, - - - of the main signal packages 103a, 103b, - - - store a control program for drive-controlling the devices 102a, 102b, - - - to be the targets of control done by the microprocessors 106a, 106b, - - - , a program for detecting a fault generated in the devices 102a, 102b, - - - as well as recovery of the fault by using the microprocessors 106a, 106b, - - - , etc. The storage module 110 of the monitoring control package 101 stores a monitoring control package program and the like for collecting and processing the fault generation notification and the fault recovery notification sent from the microprocessors 106a, 106b, - - - of the main signal packages 103a, 103b, - - - , and further transferring those to the microprocessor of the master device 104. Further, as shown in FIG. 14, the master device 104 is constituted with a normal personal computer or a work station functioning as a user terminal, a master monitoring system, or the like, and the master device 104 includes: a microprocessor 112 for arithmetic operation processing; a ROM 113 which stores a startup program and the like of the microprocessor 112; a nonvolatile memory 114 which stores various kinds of parameters and the like; a RAM 115 used for a temporal memory or the like of arithmetic operation data; a hard disk 117 as a mass-storage device; an interface 116 for connecting to the monitoring control package 101 of the trunk transmission device 100; and the like. A keyboard 119 as well as a mouse 120 functioning as man-to-machine interfaces and a monitor 121 functioning as a machine-to-man interface are connected to an input/output circuit 118 of the microprocessor 112.

The hard disk 117 constituting a part of the storage module of the master device 104 stores an application program for executing various applications by drive-controlling the microprocessor 112 of the master device 104, a master device program for processing data transmitted from the microprocessor 105 of the monitoring control package 101, etc.

More specifically, the monitoring control package program stored in the storage module 110 of the monitoring control package 101 is structured to store fault generation notifications transmitted from the microprocessors 106a, 106b, - - - of the main signal packages 103a, 103b, - - - to a data temporary storage region provided to the storage module 110 of the monitoring control package 101 along a time series cyclically without exception, and to measure a passage time from the point at which each instant fault generation history is stored by each instant fault generation history. The monitoring control package program is structured to erase the fault generation notification from the data temporary storage region of the storage module 110 when a fault recovery notification transmitted from the main signal packages 103a, 103b, - - - in accordance with a detection of recovery of the fault corresponding to the fault generation notification is detected before the passage time reaches a time set in advance. In the meantime, the monitoring control package program is structured to transfer the fault generation notification to the master device 104 as an alarm generation history, to erase the fault generation notification from the data temporary storage region of the storage module 110, and to store it as an alarm generation history to an alarm generation history storage table 122 of the storage module 110 when a fault recovery notification transmitted from the main signal packages 103a, 103b, - - - in accordance with a detection of recovery of the fault corresponding to the fault generation notification is not detected even after the passage time from the point at which the fault generation notification is stored reaches the time set in advance.

As a measuring module for measuring the passage time from the point at which the fault generation notification is stored by each fault generation notification, it is typical to use a counter or the like for counting a machine clock or the like of the microprocessor 105 of the monitoring control package 101.

Further, the fault generation notification transmitted from the monitoring control package 101 as the alarm generation history is received by the microprocessor 112 of the master device 104, and the microprocessor 112 of the master device 104 controlled by the master device program stores the fault generation notification as the alarm generation history to an alarm generation history storage table 123 that is provided to the hard disk 117 as the storage module of the master device 104.

Further, when the fault recovery notification transmitted from the main signal packages 163a, 103b, - - - in accordance with a detection of recovery of the fault corresponding to the fault generation notification already stored as the alarm generation history to an alarm generation history storage table 122 of the monitoring control package 101 is detected by the microprocessor 105 of the monitoring control package 101, the microprocessor 105 controlled according to the monitoring control package program stores the fault recovery notification as an alarm recovery history to the alarm generation history storage table 122 by corresponding to the fault generation notification that is already stored to the alarm generation history storage table 122, and transfers the fault recovery notification to the master device 104.

Further, the fault recovery notification transmitted as the alarm recovery history from the monitoring control package 101 is received by the microprocessor 112 of the master device 104, and the microprocessor 112 of the master device 104 controlled by the master device program stores the fault recovery notification as the alarm recovery history by corresponding to the alarm generation history that is already stored to the alarm generation history storage table 123 provided to the hard disk 117 that is the storage module of the master device 104. The alarm generation history and the alarm recovery history stored to the alarm generation history storage table 123 of the hard disk 117 and the alarm generation history storage table 122 of the monitoring control package 101 can be displayed on a monitor 121 for allowing an operator to make reference.

Therefore, the fault generation notification related to the fault that is not recovered even after the passage of the time set in advance has passed and the fault recovery notification thereof are saved in the alarm generation history storage table 122 provided to the storage region 110 of the monitoring control package 101 and the alarm generation history storage table 123 provided to the hard disk 117 of the master device 104, respectively, as the alarm generation history and the alarm recovery history. However, the fault generation notification related to the fault that is recovered before the passage of the time set in advance passes and the fault recovery notification thereof, i.e., the fault generation notification solved instantly (referred to as instant fault generation history hereinafter) and the fault recovery notification related thereto (referred to as instant fault recovery history hereinafter) are not saved in the alarm generation history table 122 of the monitoring control package 101, to the data temporary storage region, and to the alarm generation history storage table 123 of the master device 104 at all.

Omission of the recording of the instant fault generation history and the instant fault recovery history is originally done for avoiding frequent generation of alarms by repetition of fault generation and recovery actions in a transient state at the time of fault occurrence. However, if the instant fault generation history and the instant fault recovery history are erased imprudently, a fault causing data error and the like is not recognized as an alarm, which may result in causing a difficulty for pursuing the cause of the fault after the fault is generated and for the maintenance such as recovering works.

The point in regards to ignoring the fault that is recovered in a short time is as depicted in Japanese Unexamined Patent Publication Hei 9-64829 (Paragraph 0007: Patent Document 1), Japanese Unexamined Patent Publication 2000-331266 (Paragraph 0004: Patent Document 2), and the like.

It is therefore an exemplary object of the present invention to provide a fault information managing method and a fault information managing program capable of saving an instant fault generation history and an instant fault recovery history without omitting recording thereof and capable of pursuing the cause of the fault that generates data error and the like and performing recovery works and the like accurately.

SUMMARY OF THE INVENTION

The fault information managing method according to an exemplary aspect of the invention is a fault information managing method of a trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device. In order to achieve the foregoing exemplary object, the method is particularly characterized to include:

storing each of the fault generation notifications transmitted from each of the main signal packages at least to a storage module provided at least either to the monitoring control package or to the master device along a time series cyclically without exception; and storing each of the fault recovery notifications transmitted in accordance with a detection of recovery of the fault corresponding to each of already stored fault generation notifications to the storage module by corresponding to each of the already stored fault generation notifications.

The fault information managing program according to another exemplary aspect of the invention is a fault information managing program of a trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device. In order to achieve the same exemplary object, the program is characterized to include a monitoring control package program which causes a microprocessor of the monitoring control package to function is: an instant fault generation history registering module which stores each of the fault generation notifications to an instant fault generation history storage table provided to a storage module of the monitoring control package as an instant fault generation history along a time series cyclically without exception; a measuring module which measures a passage time from a point at which each instant fault generation history is stored by each instant fault generation history; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification as an alarm generation history to the master device; and an alarm recovery history registering/transferring module which stores a fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package, and transfers the fault recovery, notification to the master device, and a master device program which causes a microprocessor of the master device to function as an alarm generation history registering module which stores the fault generation notification received from the monitoring control package to an alarm generation history storage table provided to the master device as an alarm generation history, and an alarm recovery history registering module which stores the fault recovery notification received from the monitoring control package to the alarm generation history storage table provided to the master device as an alarm recovery history.

Further, the fault information managing program may be structured to include a monitoring control package program which causes a microprocessor of the monitoring control package to function as: an instant fault generation history registering/transferring module which stores each of the fault generation notifications to an instant fault generation history storage table provided to a storage module of the monitoring control package as an instant fault generation history along a time series cyclically without exception and transfers the fault generation notification to the master device as an instant fault generation history; a measuring module which measures a passage time from a point at which each instant fault generation history is stored by each instant fault generation history; an instant fault recovery history registering/transferring module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package and transfers the fault recovery notification to the master device as the instant fault recovery history; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification to the master device as the alarm generation history; and an alarm recovery history registering/transferring module which stores the fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package and transfers the fault recovery notification to the master device as the alarm recovery history, and a master device program which causes a microprocessor of the master device to function as: an instant fault generation history registering module which stores the fault generation notification received as the instant fault generation history from the monitoring control package to an instant fault generation history storage table provided to the master device as the instant fault generation history; an instant fault recovery history registering module which stores the fault recovery notification received as the instant fault recovery history from the monitoring control package as the instant fault recovery history by corresponding to the instant fault generation history already stored to the instant fault generation history storage table provided to the master device as the instant fault recovery history; an alarm generation history registering module which stores the fault generation notification received as the alarm generation history from the monitoring control package to an alarm generation history storage table provided to the master device as an alarm generation history; and an alarm recovery history registering module which stores the fault recovery notification received as the alarm recovery history from the monitoring control package by corresponding to the alarm generation history already stored to the alarm generation history storage table provided to the master device as the alarm recovery history.

Furthermore, the fault information managing program may be structured to include a monitoring control package program which causes a microprocessor of the monitoring control package to function as: a fault generation notification transferring module which transfers each of the fault generation notifications transmitted from each of the main signal packages to the master device along a time series without exception; and a fault recovery notification transferring module which transfers each of the fault recovery notifications transmitted from each of the main signal packages in accordance with a detection of recovery of the fault corresponding to the fault generation notification to the master device along a time series without exception, and a master device program which causes a microprocessor of the master device to function as: an instant fault generation history registering module which stores each of the fault generation notifications to an instant fault generation history storage table provided to a storage module of the master device as an instant fault generation history along a time series cyclically without exception; a measuring module which measures a passage time from a point at which each instant fault generation history is stored by each instant fault generation history; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the master device; an alarm generation history registering module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the master device as an alarm generation history; and an alarm recovery history registering module which stores the fault recovery notification transmitted in accordance with a detection of recovery of the fault corresponding to the fault generation notification as an alarm recovery history by corresponding to the alarm generation history already stored to the alarm generation history storage table provided to the storage module of the master device.

BRIEF DESCRIPTION OF THE DRAWINGS

FIG. 9 is a conceptual chart showing an example of a logical structure of an alarm generation history storage table provided to a storage module of the monitoring control package according to the same exemplary, embodiment;

FIG. 10 is a conceptual chart showing a corresponding relation between a passage time measuring resister functioning as a part of a measuring module and state storage flags;

DETAILED DESCRIPTIONS OF THE PREFERRED EMBODIMENTS

Next, some exemplary modes for embodying the present inventions will be described in a specific manner by referring to the accompanying drawings.

Figure 1:
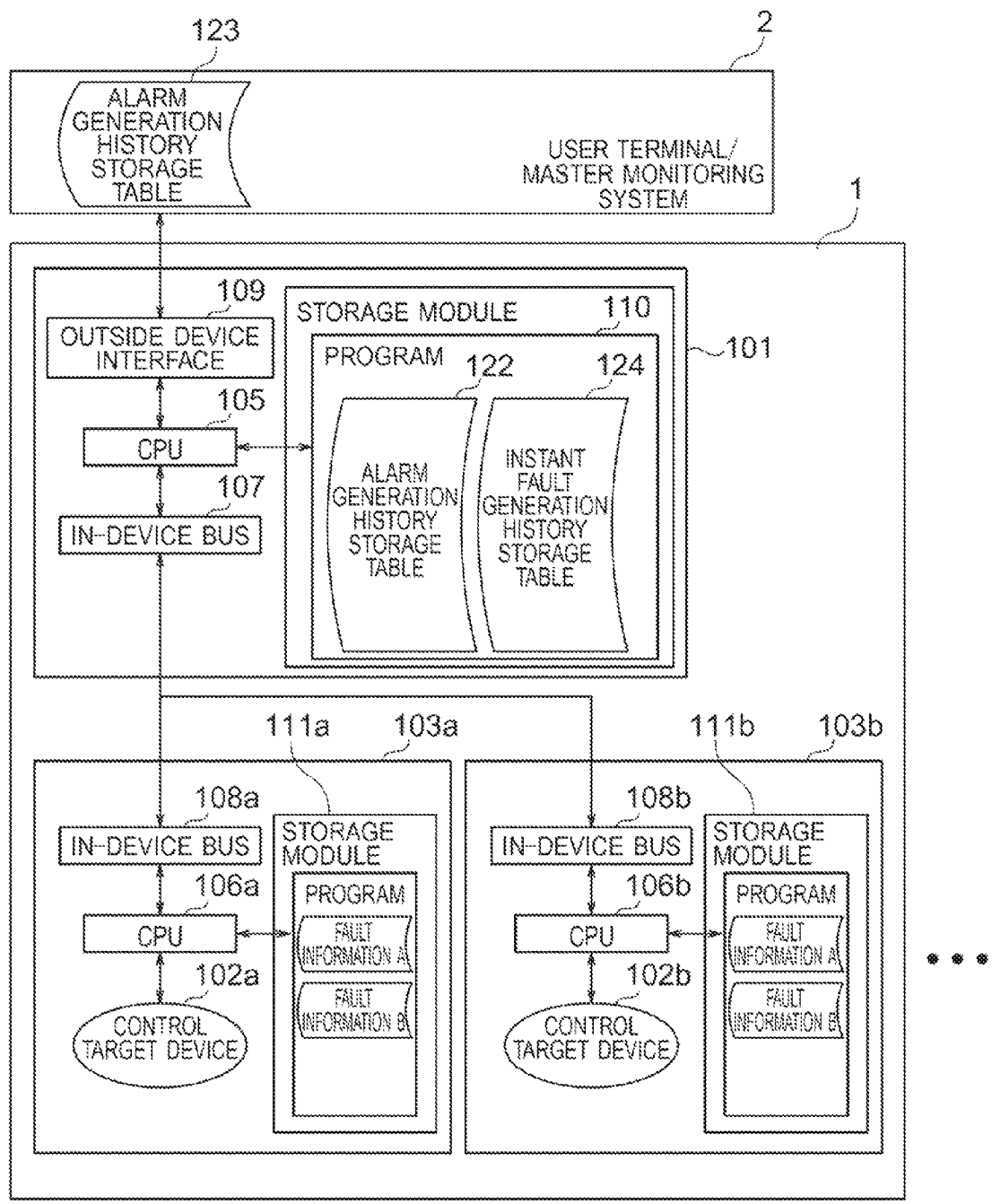
FIG. 1 is a functional block showing simplified illustrations of a trunk transmission device and its master device of an exemplary embodiment to which the fault information managing method and the fault information managing program according to the present invention are applied.

FIG. 1 is a functional block showing simplified illustrations of a trunk transmission device and its master device of an exemplary embodiment to which the fault information managing method and the fault information managing program according to the present invention are applied.

This trunk transmission device 1 includes: main signal packages 103a, 103b, - - - for each of devices 102a, 102b, - - - which detect a fault generated in each of the devices 102a, 102b, - - - as the targets of control as well as recovery of the fault and transmit a fault generation notification and a fault recovery notification to a monitoring control package 101; and the monitoring control package 101 which receives the fault generation notification and the fault recovery notification from each of the main signal packages 103a, 103b, - - - and transmits at least a part thereof to a user terminal or a master device 2 such as a master monitoring system.

A microprocessor 105 of the monitoring control package 101 and microprocessors 106a, 106b, - - - of each of the main signal processors 103a, 103b, - - - are connected to be able to transmit information mutually via an in-device bus 107 of the microprocessor 105 and in-device buses 108a, 108b, - - - of the microprocessors 106a, 106b, - - - . Further, the microprocessor 105 of the monitoring control package 101 and a microprocessor of the master device 2 are connected mutually to be able to transmit information via an interface 109 used for outside the device.

The microprocessor 105 of the monitoring control package 101 includes a storage module 110 constituted with a ROM, a RAM, and a nonvolatile memory. Further, the microprocessors 106a, 106b, - - - of the main signal packages 103a, 103b, - - - also include storage modules 111a, 111b, - - - each being constituted with a ROM, a RAM, and a nonvolatile memory.

The storage modules 111a, 111b, - - - of the main signal packages 103a, 103b, - - - store a control program for drive-controlling the devices 102a, 102b, - - - to be the targets of control done by the microprocessors 106a, 106b, - - - and a program for detecting a fault generated in the devices 102a, 102b, - - - and recovery of the fault by using the microprocessors 106a, 106b, - - - , etc. The storage module 110 of the monitoring control package 101 stores a monitoring control package program and the like for collecting and processing the fault generation notification and the fault recovery notification sent from the microprocessors 106a, 106b, - - - of the main signal packages 103a, 103b, - - - , and further transferring those to the microprocessor of the master device 2.

Figure 14:
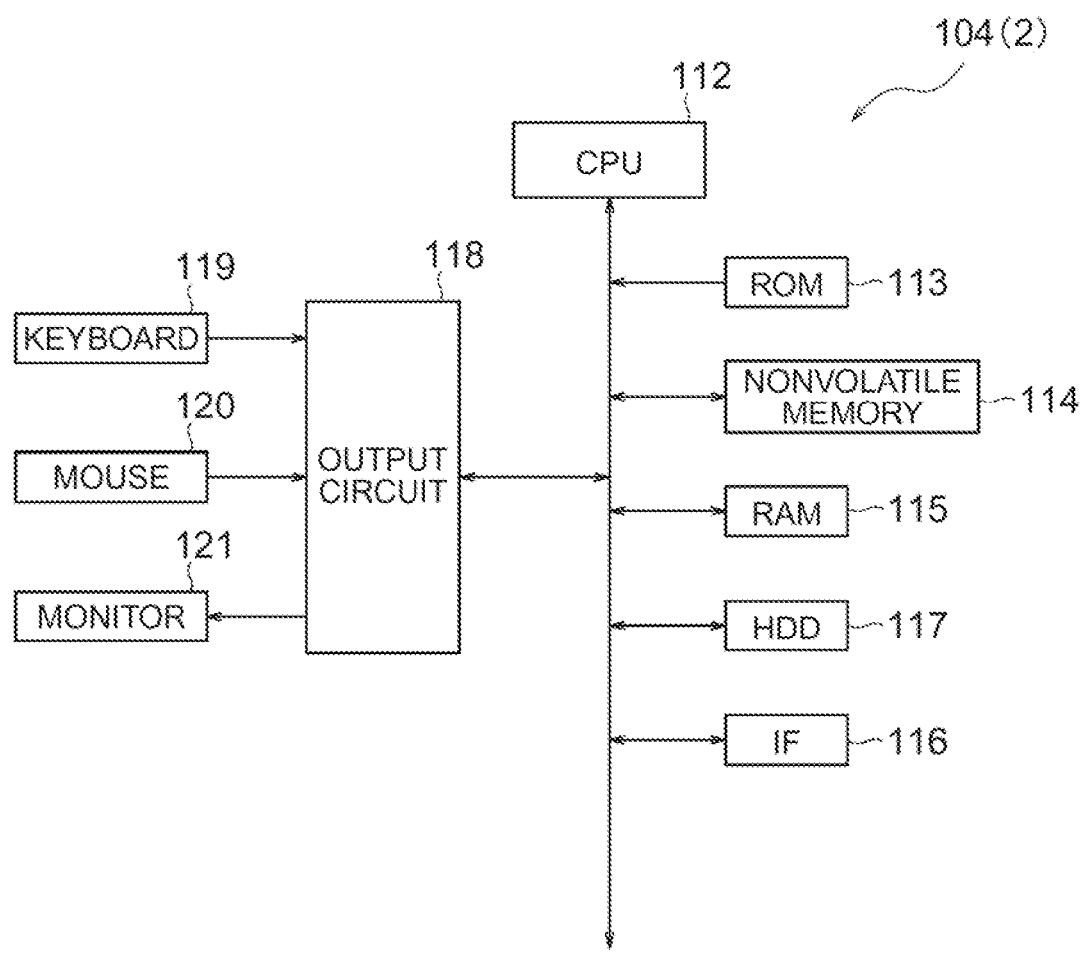
FIG. 14 is a block diagram showing a simplified illustration of the well-known master device.

Further, as in the case of the master device 104 of a conventional case shown in FIG. 14, the master device 2 is constituted with a normal personal computer or a work station functioning as a user terminal, a master monitoring system, or the like, and the master device 2 includes: a microprocessor 112 for arithmetic operation processing; a ROM 113 which stores a startup program and the like of the microprocessor 112; a nonvolatile memory 114 which stores various kinds of parameters and the like; a RAM 115 used for a temporal memory or the like of arithmetic operation data; a hard disk 117 as a mass-storage device; an interface 116 for connecting to the monitoring control package 101 of the trunk transmission device 100; and the like. A keyboard 119 as well as a mouse 120 functioning as man-to-machine interfaces and a monitor 121 functioning as a machine-to-man interface is connected to an input/output circuit 118 of the microprocessor 112.

The hard disk 117 constituting a part of the storage module of the master device 2 stores an application program for executing various applications by drive-controlling the microprocessor 112 of the master device 2, a master device program for processing data transmitted from the microprocessor 105 of the monitoring control package 101, etc.

More specifically, the monitoring control package program stored in the storage module 110 of the monitoring control package 101 is a monitoring control package program which causes the microprocessor 105 of the monitoring control package 101 to function as: an instant fault generation history registering module which stores each of fault generation notifications transmitted from the microprocessors 106a, 106b, - - - of the main signal packages 103a, 103b, - - - to an instant fault generation history storage table 124 provided to the storage module 110 of the monitoring control package 101 as an instant fault generation history along a time series cyclically without exception; a measuring module which measures a passage time from the point at which each instant fault generation history is stored to the instant fault generation history table 124 by each instant fault generation history; an instant fault recovery history registering module which, when a fault recovery notification transmitted from the microprocessors 106a, 106b, - - - of the main signal packages 103a, 103b, - - - in accordance with a detection of recovery of the fault corresponding to the fault generation notification is detected before the passage time measured by the measuring module reaches a time set in advance, stores the fault recovery notification to the instant fault generation history storage table 124 as an instant fault recovery history by corresponding to the instant fault generation history already stored in the instant fault generation history storage table 124; an alarm generation history registering/transferring module which, when a fault recovery notification transmitted from the microprocessors 106a, 106b, - - - of the main signal packages 103a, 103b, - - - in accordance with a detection of recovery of the fault corresponding to the fault generation notification is not detected even after the passage time measured by the measuring module reaches the time set in advance, stores the fault generation notification to an alarm generation history storage table 122 provided to the storage module 110 of the monitoring control package 101 as an alarm generation history and transfers the fault generation notification as an alarm generation history to the master device 2; and an alarm recovery history registering/transferring module which stores a fault recovery notification transmitted from the microprocessors 106a, 106b, - - - of the main signal packages 103a, 103b, - - - in accordance with detection of recovery of the fault corresponding to the fault generation notification to the alarm generation history storage table 122 as an alarm recovery history by corresponding to the alarm generation history already stored to the alarm generation history storage table 122, and transfers the fault recovery notification to the master device 2.

As a measuring module for measuring the passage time from the point at which the fault generation notification is stored to the instant fault generation history storage table 124 by each fault generation notification, it is typical to use a counter or the like for counting a machine clock or the like of the microprocessor 105 of the monitoring control package 101.

Further, the fault generation notification transmitted from the monitoring control package 101 as the alarm generation history is received by the microprocessor 112 of the master device 2, and the microprocessor 112 functioning as the alarm generation history registering module of the master device 2 by being controlled by the master device program stores the fault generation notification as the alarm generation history to the alarm generation history storage table 123 that is provided to the hard disk 117 as the storage module of the master device 2.

Further, when the fault recovery notification transmitted from the main signal packages 103a, 103b, - - - in accordance with a detection of recovery of the fault corresponding to the fault generation notification already stored as the alarm generation history to the alarm generation history storage table 122 of the monitoring control package 101 is detected by the microprocessor 105 of the monitoring control package 101, the microprocessor 105 functioning as the alarm recovery generation history registering/transferring module by being controlled according to the monitoring control package program stores the fault recovery notification to the alarm generation history storage table 122 as an alarm recovery history by corresponding to the fault generation notification that is already stored as the alarm generation history to the alarm generation history storage table 122, and transfers the fault recovery notification to the master device 2 as the alarm recovery history.

Further, the fault recovery notification transmitted as the alarm recovery history from the monitoring control package 101 is received by the microprocessor 112 of the master device 2, and the microprocessor 112 of the master device 2 functioning as the alarm recovery history registering module by being controlled by the master device program stores the fault recovery notification to the alarm generation history storage table 123 as the alarm recovery history by corresponding to the alarm generation history that is already stored to the alarm generation history storage table 123 provided to the hard disk 117 that is the storage module of the master device 2.

The alarm generation history and the alarm recovery history stored in the alarm generation history storage table 123 of the hard disk 117 and the alarm history storage table 122 of the monitoring control package 101 as well as the instant fault generation history and the instant fault recovery history stored to the instant fault generation history storage table 124 provided to the storage module 110 of the monitoring control package 101 can be displayed on the monitor 121 for allowing the operator to make reference.

Figure 2:
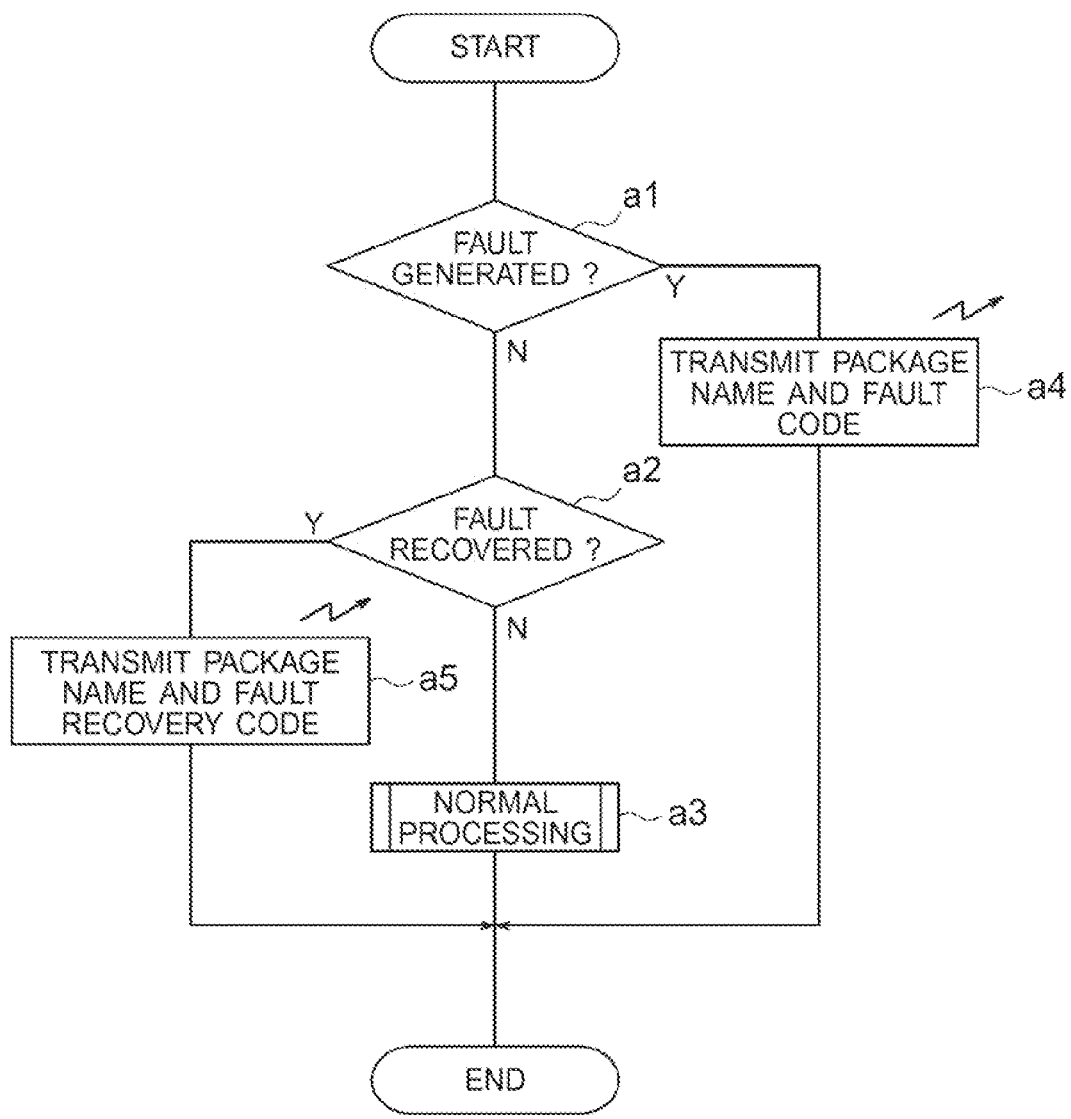
FIG. 2 is a flowchart showing the outline of processing executed by a microprocessor of a main signal package of the same exemplary embodiment.
Figure 3:
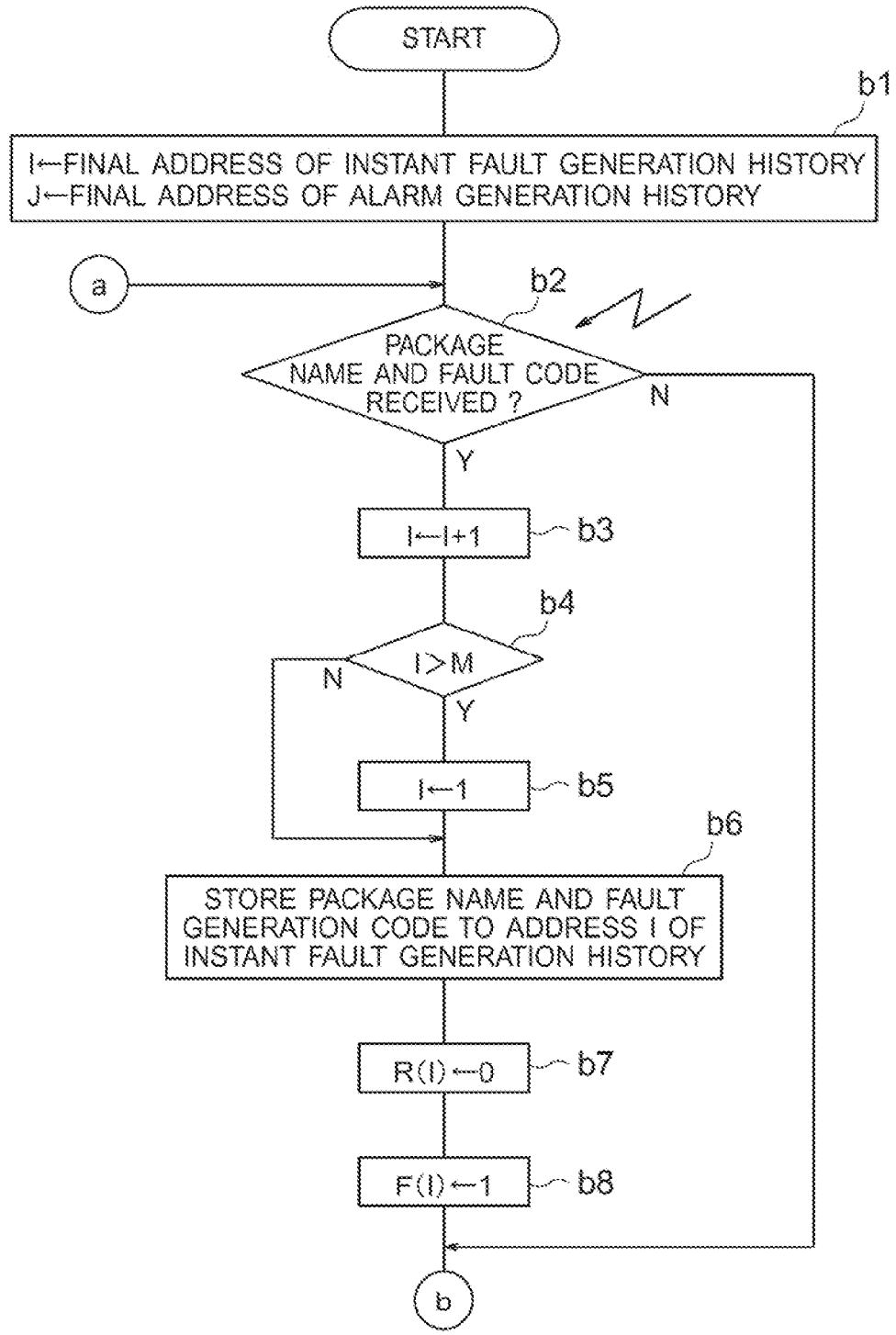
FIG. 3 is a flowchart showing the outline of the structure of a monitoring control package program according to the same exemplary embodiment.
Figure 4:
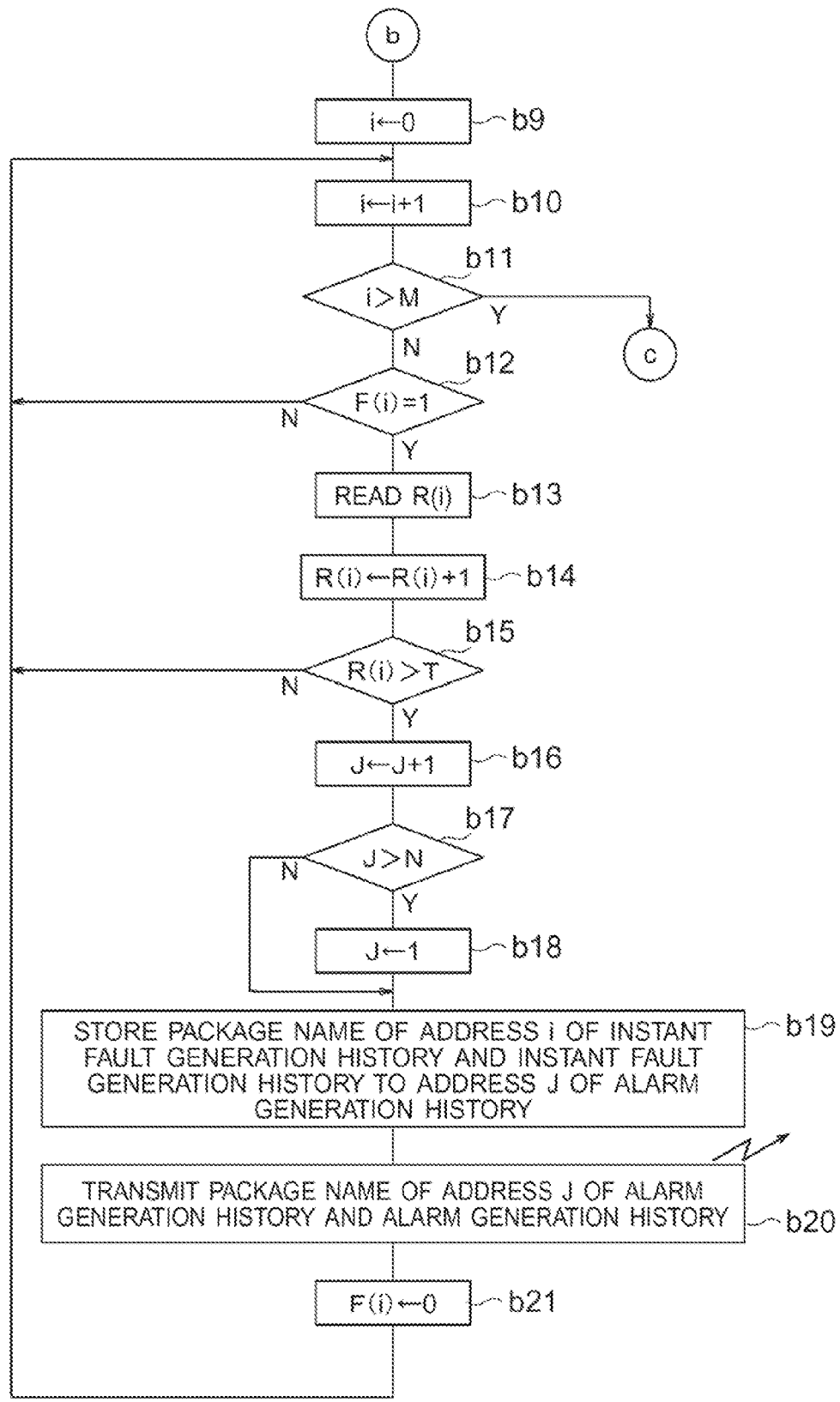
FIG. 4 is a following flowchart showing the outline of the structure of the monitoring control package program according to the same exemplary embodiment.
Figure 5:
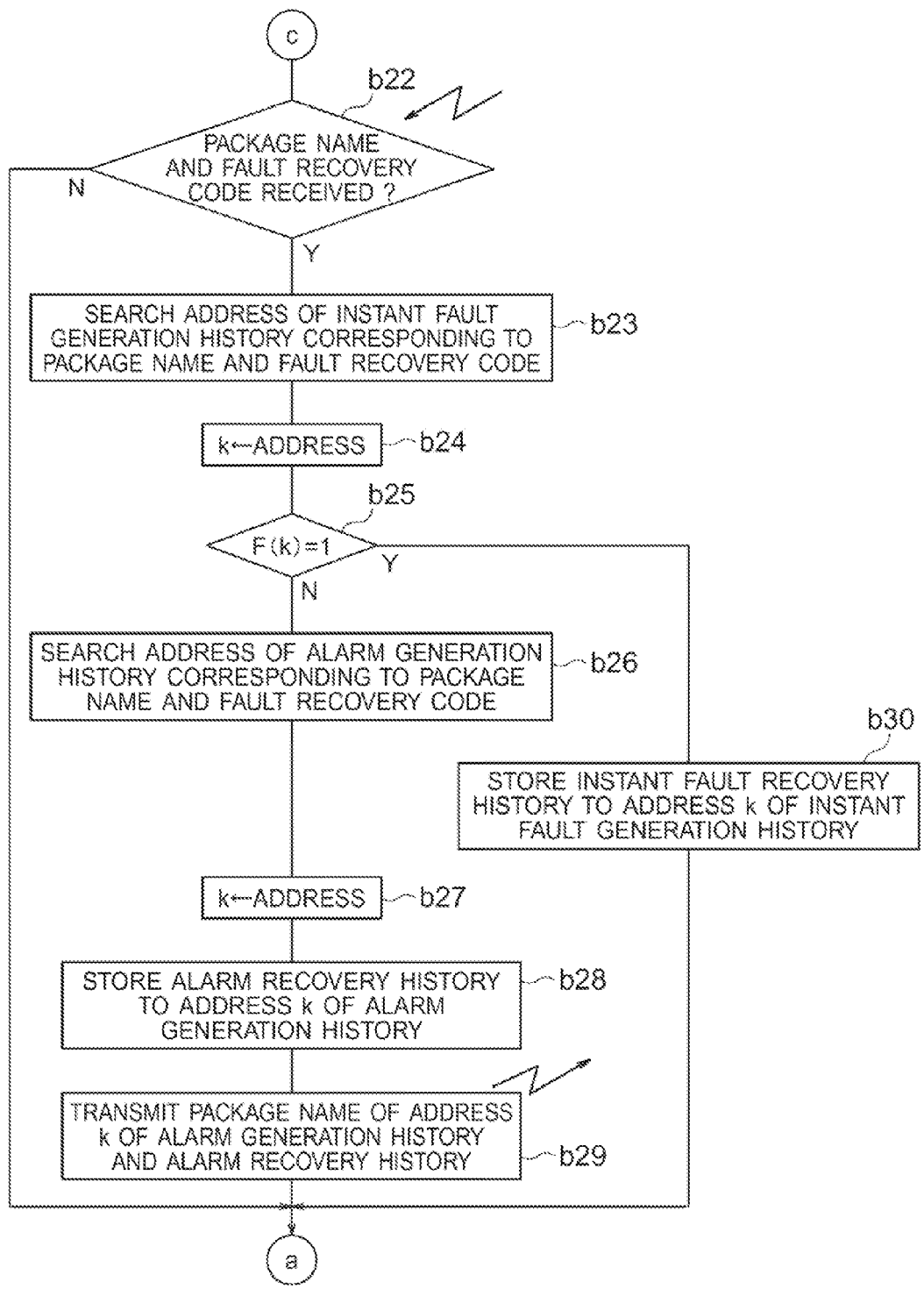
FIG. 5 is a following flowchart showing the outline of the structure of the monitoring control package program according to the same exemplary embodiment.
Figure 6:
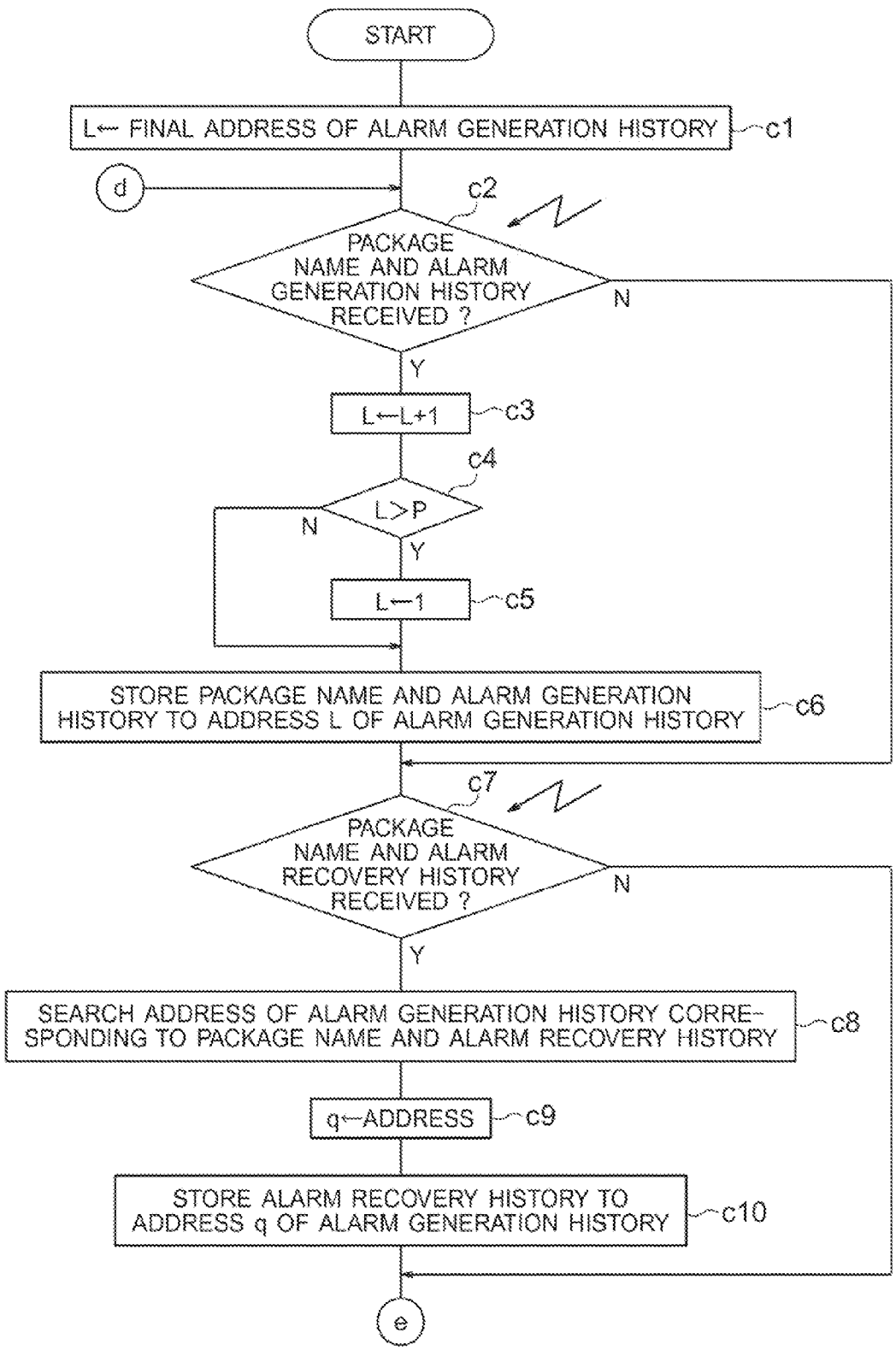
FIG. 6 is a flowchart showing the outline of the structure of a master device program according to the same exemplary embodiment.
Figure 7:
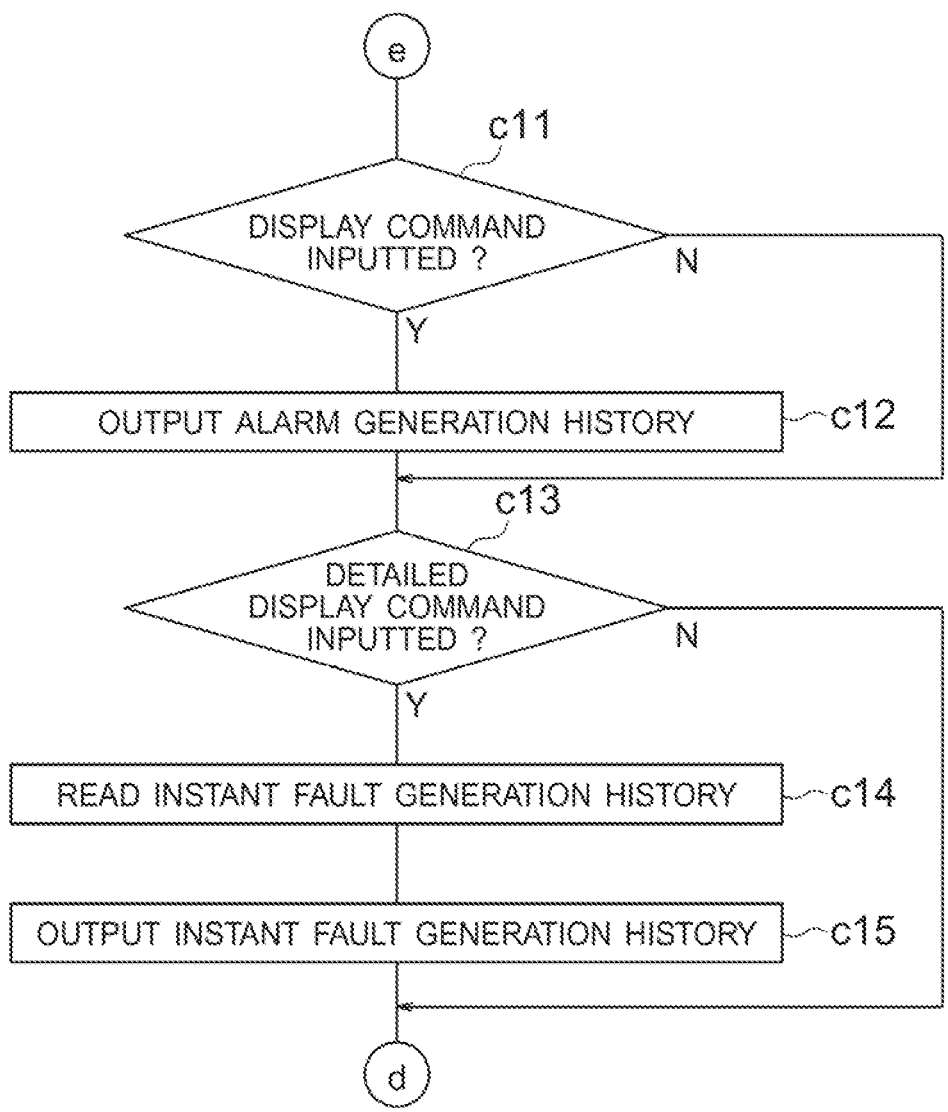
FIG. 7 is a following flowchart showing the outline of the structure of the master device program according to the same exemplary embodiment.

FIG. 2 is a flowchart showing the outline of the processing executed by the microprocessors 106a, 106b, - - - of the main signal packages 103a, 103b, - - - , FIG. 3 to FIG. 5 are flowcharts showing the outline of the structure of the monitoring control package program, and FIG. 6 and FIG. 7 are flowcharts showing the outline of the structure of the master device program.

Figure 8:
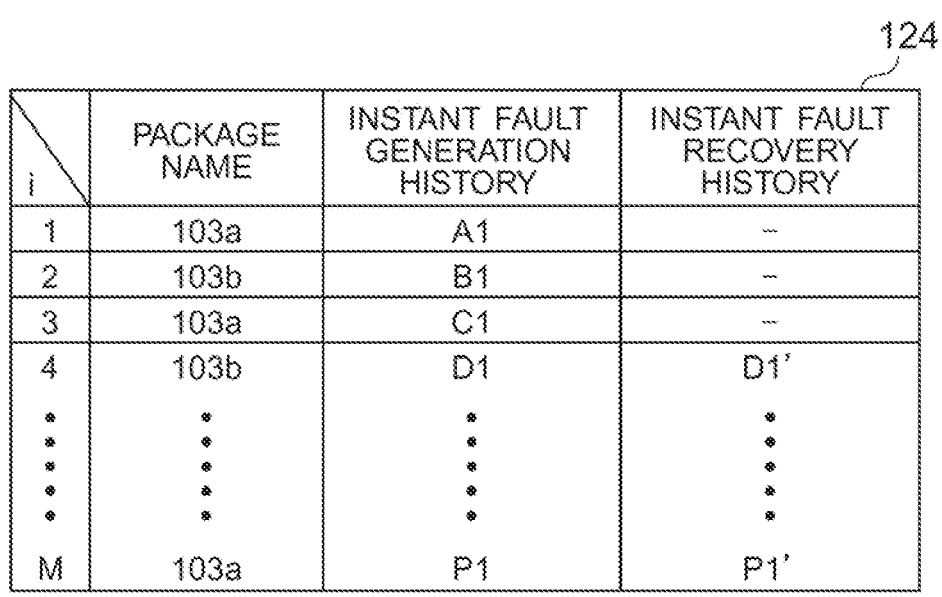
FIG. 8 is a conceptual chart showing an example of a logical structure of an instant fault generation history storage table provided to a storage module of the monitoring control package according to the same exemplary embodiment.

Further, FIG. 8 is a conceptual chart showing an example of a logical structure of the instant fault generation history storage table 124 provided to the storage module 110 of the monitoring control package 101, and FIG. 9 is a conceptual chart showing an example of a logical structure of the alarm generation history storage table 122 provided to the storage module 110 of the monitoring control package 101.

Next, the fault information managing method as well as the fault information managing program, processing operations of the microprocessors 105 of the monitoring control package 101 functioning as the instant fault generation history registering module, the measuring module, the instant fault recovery history registering module, the alarm generation history registering/transferring module, and the alarm recovery history registering/transferring module, and also processing operations of the microprocessor 112 of the master device 2 functioning as the alarm generation history registering module and the alarm recovery history registering module will be described in a specific manner by referring to the flowchart of FIG. 2 showing the outline of the processing executed by the microprocessors 106a, 106b, - - - of the main signal packages 103a, 103b, - - -, the flowcharts FIG. 3 to FIG. 5 showing the outline of the structure of the monitoring control package program, the flowcharts of FIG. 6 and FIG. 7 showing the outline of the structure of the master device program, and the conceptual charts of FIG. 8 and FIG. 9. First, the microprocessor 106a of the main signal package 103a judges occurrence of a fault in the device 102a as the control target and occurrence of recovery of that fault by every prescribed time (step a1 to step a2 of FIG. 2). When a fault generated in the device 102a is detected, the microprocessor 106a transmits a package name of the main signal package 103a and a fault code functioning as a fault generation notification indicating that there is a fault to the monitoring control package 101 (step a4). In the meantime, when recovery of the fault in the device 102a is detected, the microprocessor 106a transmits the package name of the main signal package 103a and a fault recovery code functioning as a fault recovery notification indicating that the fault is recovered to the monitoring control package 101 (step a5).

Further, when occurrence of a fault and recovery of the fault in the device 102a as the control target are not detected, the microprocessor 106a of the main signal package 103a drive-controls the device 102a as the control target according to a control signal inputted from the master device 2 via the monitoring control package 101 and a control program of the storage module 111a required for executing the control signal (step a3).

The processing operations of the microprocessor 106b of the main signal package 103b are the same as the case of the microprocessor 106a of the main signal package 103a described above except that the device to be the control target is different.

Needless to say, there is no specific limit set in the number of the main signal packages and the devices. There may be the third, fourth, fifth or more main signal packages and devices.

In the meantime, the microprocessor 105 of the monitoring control package 101 sets a final use address in the instant fault generation history storage table 124, i.e., value of the address at which the fault code as the instant fault generation history is stored most recently, to an instant fault generation history final address storage register I by executing initialization processing at the time of supplying the power. Further, the microprocessor 105 of the monitoring control package 101 sets a final use address in the alarm generation history storage table 122, i.e., value of the address at which the fault code as the alarm generation history is stored most recently, to an alarm generation history final address storage register J (step b1 of FIG. 3).

Then, the microprocessor 105 functioning as the instant fault generation history registering module judges whether or not there is any input of the fault code from the microprocessors 106a, 106b, - - - of the main signal packages 103a, 103b, - - - (step b2).

When an input of the package name and the fault code from the microprocessors 106a, 106b, - - - of the main signal packages 103a, 103b, - - - is detected and the result of judgment in step b2 becomes true, the microprocessor 105 functioning as the instant fault generation history registering module increments the value of the instant fault generation history final address storage register I (step b3) by "1" and judges whether or not the current value of the register I exceeds the maximum storable number M of the instant fault generation history in the instant fault generation history storage table 124 (step b4).

When the current value of the instant fault generation history final address storage register I does not exceed the maximum storable number M of the instant fault generation history in the instant fault generation history storage table 124 and the result of judgment in step b4 becomes false, the microprocessor 105 functioning as the instant fault generation history registering module stores the package name and the fault code detected in the processing of step b2 as the instant fault generation history to the address of the instant fault generation history storage table 124 shown by the current value of the register I (step b6). In the meantime, when the current value of the register I exceeds the maximum storable number M of the instant fault generation history in the instant fault generation history storage table 124 and the result of judgment in step b4 becomes true, the microprocessor 105 functioning as the instant fault generation history registering module initializes the current value of the register I again to "1" (step b5), and overwrites the package name and the fault code detected in the processing of step b2 to the address of the instant fault generation history storage table 124 shown by the current value of the register I, i.e., the front address of the instant fault generation history storage table 124, as the instant fault generation history to be stored cyclically (step b6).

Then, the microprocessor 105 functioning as the measuring module initializes the value of a passage time measuring register R(I) corresponding to the current value of the instant fault generation history final address storage register I to "0" to start measurement of the passage time from the point at which the instant fault generation history is stored to the address I in the instant fault generation history storage table 124 (step b7), and sets a value "1" to a state storage flag F(I) corresponding to the current value of the register I to store that the passage time from the point at which the instant fault generation history is stored to the address I in the instant fault generation history storage table 124 has not reached the time T set in advance (step b8). The passage time measuring register R(I) functioning as the counter and the state storage flag F(I) correspond to each other on one-on-one basis as shown in the conceptual chart shown in FIG. 10 with the value of integer I being the intermediation. Further, those also correspond to combinations of the package names and the fault codes stored at the addresses I of the instant fault generation history storage table 124 of FIG. 8 on one-on-one basis with the value of I being the intermediation.

When an input of the package name and the fault code from the microprocessors 106a, 106b, - - - of the main signal packages 103a, 103b, - - - is not detected and the result of judgment in step b2 becomes false, the processing of step b3 to step b8 is unexecuted so that the instant fault generation history registering module is not operated.

Then, the microprocessor 105 functioning as the measuring module initializes the value of a table search index i to "0" once (step b9), increments the value of the index i by "1" (step b10), and then judges whether or not the current value of the index i exceeds the maximum storable value M of the instant fault generation history (step b11). When the current value does not exceed the value M, the microprocessor 105 refers to the value of the state storage flag F(i) corresponding to the combination of the package name and the fault code stored to the addresses of the instant fault generation history storage table 124 on one-on-one basis to judge whether the value is "1" or "0" (step b12).

When the value of the state storage flag F(i) is "1" and the result of judgment in step b12 becomes true, it means that the passage time from the point at which the instant fault generation history is stored to the address i in the instant fault generation history storage table 124 has not reached the time T set in advance. Thus, the microprocessor 105 functioning as the measuring module reads the current value of the passage time measuring register R(i) corresponding to the combination of the package name and the fault code stored in the address i of the instant fault generation history storage table 124 on one-on-one basis based on the value of the table search index i (step b13), increments the value of the register R(i) to update/store the value to the passage time measuring register R(i) (step b14).

That is, the value acquired by multiplying one processing period of the microprocessor 105 to the current value of the passage time measuring register R(i) is the passage time from the point at which the instant fault generation history is stored to the address i of the instant fault generation storage table 124.

Then, the microprocessor 105 judges whether or not the time shown by the current value of the passage time measuring register R(i) has reached the time T set in advance (step b15).

When the time shown by the current value of the passage time measuring register R(i) does not reach the time T set in advance and the result of judgment in step b15 becomes false, it is not necessary to store the combination of the package name and the fault code stored to the address i of the instant fault generation history storage table 124 as the instant fault generation history to the alarm generation history storage table 122 as the alarm generation history.

Thus, in that case, the microprocessor 105 returns to the processing of step b10 again, and repeats execution of the same above-described processing by incrementing the value of the table search index i by "1".

Further, when the value of the state storage flag F(i) is "0" and the result of judgment in step b12 becomes false, it means that the passage time from the point at which the instant fault generation history is stored to the address i in the instant fault generation history storage table 124 has already reached the set time T and the instant fault generation history is already stored to the alarm generation history storage table 122 as the alarm generation history. Thus, it is not allowed to store the combination of the package name and the fault code stored as the instant fault generation history at the address i of the alarm generation history storage table 124 as the alarm generation history in the alarm generation history storage table 122 in a duplicated manner. Therefore, in that case, the processing of step b13 to step b21 is also unexecuted, and the microprocessor 105 returns to the processing of step b10 again and repeats execution of the same above-described processing by incrementing the value of the table search index i by "1".

In the meantime, when the result of judgment in step b15 becomes true and it is found that the time shown by the current value of the passage time measuring register R(i) has reached the time T set in advance, it means that the passage time from the point at which the instant fault generation history is stored to the address i in the instant fault generation history storage table 124 comes to reach the time T set in advance at this point for the first time. More specifically, it means that even after the passage time from the point at which the fault generation notification as the instant fault generation history is stored to the address i in the instant fault generation history storage table 124 has reached the time T set in advance, a fault recovery notification transmitted in accordance with a detection of recovery of the fault corresponding to the fault generation notification is not detected.

Thus, in that case, the microprocessor 105 functioning as the alarm generation history registering/transferring module increments the value of the alarm generation history final address storage register J by "1" (step b16), and judges whether or not the current value of the register J exceeds the maximum storable number N of the alarm generation history in the alarm generation history storage table 122 (step b17).

When the current value of the register J does not exceed the maximum storable number N of the alarm generation history in the alarm generation history storage table 122 and the result of judgment in step b17 becomes false, the microprocessor 105 functioning as the alarm generation history registering/transferring module stores the combination of the package name and the fault code stored to the address i of the instant fault generation history storage table 124 to the address of the alarm generation history storage table 122 shown by the current value of the register J as the alarm generation history (step b19). In the meantime, when the current value of the register J exceeds the maximum storable number N of the alarm generation history in the alarm generation history storage table 122 and the result of judgment in step b17 becomes true, the microprocessor 105 functioning as the alarm generation history registering/transferring module initializes the current value of the register J again to "1" (step b18), and overwrites the combination of the package name and the fault code stored to the address i of the instant fault generation history storage table 124 to the address of the history generation history storage table 122 shown by the current value of the register J, i.e., the front address of the alarm generation history storage table 122, as the alarm generation history to be stored cyclically (step b19).

Then, the microprocessor 105 functioning as the alarm generation history registering/transferring module transfers the combination of the package name and the fault code stored to the address J of the alarm generation history storage table 122 to the master device 2 as the alarm generation history (step b20), and sets a value "0" to the state storage flag F(i) that corresponds to the current value of the table search index i to store that the combination of the package name and the fault code stored to the address i of the instant fault generation history storage table 124 as the instant fault generation history is stored to the alarm generation history storage table 122 as the alarm generation history.

In that case, processing of erasing the instant fault generation history that is the combination of the package name and the fault code stored to the address i of the instant fault generation history storage table 124 currently from the instant fault generation history storage table 124 is not executed.

In the meantime, the microprocessor 112 of the master device 2 has completed the processing of setting the final use address in the alarm generation history storage table 123, i.e., the address to which the fault code is stored as the alarm generation history most recently, to an alarm generation history final address storage register L by the initialization processing executed at the time of supplying the power (c1 of FIG. 6).

The alarm generation history, i.e., the combination of the package name and the fault code transmitted from the microprocessor 105 of the monitoring control package 101 is detected by the microprocessor 112 of the master device 2 by judging processing of step, c2.

Then, the microprocessor 112 of the master device 2 functioning as the alarm generation history registering module increments the value of the alarm generation history final address storage register L by "1" (step c3), and judges whether or not the current value of the register L exceeds the maximum storable number P of the alarm generation history in the alarm generation history storage table 123 (step c4).

When the current value of the register L does not exceed the maximum storable number P of the alarm generation history in the alarm generation history storage table 123 and the result of judgment in step c4 becomes false, the microprocessor 112 functioning as the alarm generation history registering module stores the combination of the package name and the fault code transmitted from the microprocessor 105 of the monitoring control package 101 to the address of the alarm generation history storage table 123 shown by the current value of the register L as the alarm generation history (step c6). In the meantime, when the current value of the register L exceeds the maximum storable number P of the alarm generation history in the alarm generation history storage table 123 and the result of judgment in step c4 becomes true, the microprocessor 112 functioning as the alarm generation history registering module initializes the current value of the register L again to "1" (step c5), and overwrites the combination of the package name and the fault code transmitted from the microprocessor 105 of the monitoring control package 101 to the address of the alarm generation history storage table 123 shown by the current value of the register L, i.e., the front address of the alarm generation history storage table 123, as the alarm generation history to be stored cyclically (step c6).

The structure of the alarm generation history storage table 123 is the same as that of the alarm generation history storage table 122 of the monitoring control package 101 except that the scale thereof is larger (see FIG. 9).

Further, when the microprocessors 106a, 106b, - - - of the main signal packages 103a, 103b, - - - detect recovery of a fault in the devices 102a, 102b, - - - and transmit the package name and the fault recovery code of the main signal packages 103a, 103b, - - - to the monitoring control package 101 (see step a5 of FIG. 2), the microprocessor 105 of the monitoring control package 101 detects that by judging processing of step b22.

Then, the microprocessor 105 of the monitoring control package 101 searches the instant fault generation history storage table 124 as in FIG. 8 to find the address in the instant fault generation history storage table 124 to which the combination of the package name detected by the processing of step b22 and the fault code corresponding to the fault recovery code detected in the processing of step b22 is stored as the instant fault generation history (step b23), and stores the address to an address storage register k (step b24).

A fault code showing a specific fault and a fault recovery code showing recovery of that fault are in a corresponding relation of one-on-one basis, so that it is possible to specify the fault code that is the cause of the fault based on the fault recovery code.

Then, the microprocessor 105 refers to the value of the state storage flag F(k) that is specified by the value of the address storage register k, and judges whether the value is "1" or "0", i.e., judges whether or not the passage time from the point at which the instant fault generation history stored to the address k of the instant fault generation history storage table 124 has reached the time T that is set in advance (step b25).

When the value of the state storage flag F(k) is "1", it means that the passage time from the point at which the instant fault generation history is stored to the address k in the instant fault generation history storage table 124 has not reached the time T set in advance, i.e., it means that a fault recovery notification transmitted in accordance with a detection of recovery of the fault corresponding to the fault generation notification is detected before the passage time measured by the measuring module reaches the time T set in advance. Thus, the microprocessor 105 functioning as the instant fault recovery history registering module stores the fault recovery code detected in the processing of step b22 to the address of the instant fault generation history storage table 124 that is specified by the value of the address storage register k as the instant fault recovery history (step b30).

Figure 10:
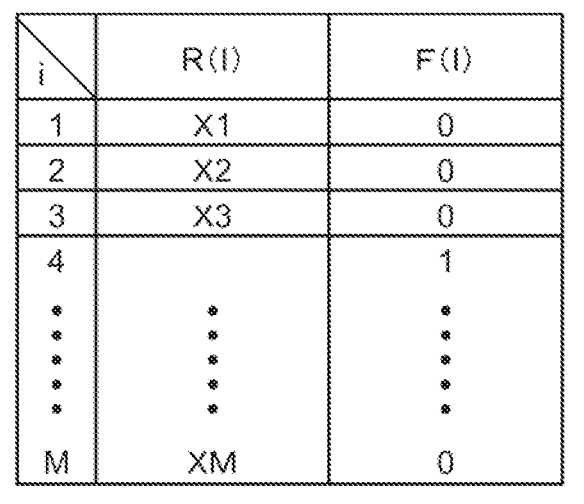

For example, assuming that the microprocessor 105 of the monitoring control package 101 receives a fault recovery code D1' from the microprocessor 106b of the main signal package 103b in the processing of step b22 in the case of FIG. 8 and FIG. 10, a fault code D1 corresponding to the fault recovery code D1' is specified based on the fault recovery code D1', the address value "4" at which the combination of the package name 103b and the fault code D1 is stored is acquired from the instant fault generation history storage table 124 as shown in FIG. 8, and the address is stored to the address storage register k (see step b23 to step b24).

As shown in FIG. 10, the value of the state storage flag F(4) is "1" and it can be found that the passage time from the point at which the fault code D1 as the instant fault generation history is stored to the address 4 of the instant fault generation history storage table 124 has not reached the time T set in advance, i.e., it is found that the fault recovery code D1' corresponding to the fault code D1 from the main signal package 103b is detected before the passage time measured by the measuring module reaches the time T set in advance (see step b25). Thus, the fault recovery code D1' is stored to the address 4 of the instant fault generation history storage table 124 as the instant fault recovery history (see step b30).

Further, when the value of the state storage flag F(k) is "0" and the result of judgment in step b25 becomes false, it means that the passage time from the point at which the instant fault generation history is stored to the address k of the instant fault generation history storage table 124 exceeds the time T set in advance, i.e., it means that the fault recovery notification transmitted in accordance with a detection of the recovery of the fault corresponding to the fault generation notification is detected after the passage time measured by the measuring module reached the time T set in advance. In other words, it means that the fault code corresponding to the package name and the fault recovery code is already being stored in the alarm generation history storage table 122 as the alarm generation history. Thus, the microprocessor 105 functioning as the alarm recovery history registering/transferring module searches the alarm generation history storage table 122 as shown in FIG. 9, acquires the address of the alarm generation history storage table 122 at which the combination of the package name detected in the processing of step b22 and the fault code corresponding to the fault recovery code detected in the processing of step b22 is stored as the alarm generation history (step b26), and stores the address to the address storage register k (step b27).

Then, the microprocessor 105 functioning as the alarm recovery history registering/transferring module stores the fault recovery code detected in the processing of step b22 to the address of the alarm generation history storage table 122 specified by the value of the address storage register k as the alarm recovery history (step b28). Further, the microprocessor 105 transfers the alarm recovery history stored to the address k of the alarm generation history storage table 122, i.e., the package name detected in the processing of step b22 and the fault recovery code detected in the processing of step b22, to the master device 2 (step b29).

For example, assuming that the microprocessor 105 of the monitoring control package 101 receives a fault recovery code A1' from the microprocessor 106 of the main signal package 103a in the judging processing of step b22 in the case of FIG. 8 and FIG. 10, a fault code A1 corresponding to the fault recovery code A1' is specified based on the fault recovery code A1', the address value "1" at which the combination of the package name 103a and the fault code A1 is stored is acquired from the instant fault generation history storage table 124 as shown in FIG. 8, and the address is stored to the address storage register k (see step b23 to step b24).

As shown in FIG. 10, the value of the state storage flag F(1) is "0" and it can be found that the passage time from the point at which the fault code A1 as the instant fault generation history is stored to the address 1 of the instant fault generation history storage table 124 exceeds the time T set in advance, i.e., it is found that the fault recovery code A1' corresponding to the fault code A1 from the main signal package 103a is detected after the passage time measured by the measuring module reached the time T set in advance (see step b25).

Thus, in this case, the address value "1" at which the combination of the package name 103a and the fault code A1 is stored is acquired from the alarm generation history storage table 122 as shown in FIG. 9, the address is stored to the address storage register k (see step b26 to step b27), and the fault recovery code A1' described above is stored to the address 1 of the alarm generation history storage table 122 as the alarm recovery history (see step b28). Further, the alarm recovery history stored to the address 1 of the alarm generation history storage table 122, i.e., the package name 103a and the fault recovery code A1', is transferred to the master device 2 (see step b29).

While the fault recovery code corresponding to the fault code stored as the alarm generation history is stored only to the alarm generation history storage table 122 as the alarm recovery history in this exemplary embodiment (see FIG. 8 and FIG. 9), the same fault recovery code may also be stored in a section of the instant fault recovery history of the instant fault generation history storage table 124.

The combination of the package name and the fault recovery code transmitted from the microprocessor 105 of the monitoring control package 101, i.e., the alarm recovery history, is detected by the microprocessor 112 of the master device 2 in the judging processing of step c7 shown in FIG. 6.

Then, the microprocessor 112 of the master device 2 functioning as the alarm recovery history registering module searches the alarm generation history storage table 123 within the hard disk 117 to acquire the address in the alarm generation history storage table 123 to which the combination of the package name detected in the processing of step c7 and the fault recovery code detected in the processing of step c7 is stored as the alarm generation history (step c8), and stores the address to an address storage register q (step c9).

A fault code showing a specific fault and a fault recovery code showing recovery of that fault are in a corresponding relation of one-on-one basis, so that it is possible to specify the fault code that is the cause of the fault based on the fault recovery code.

Then, the microprocessor 112 functioning as the alarm recovery history registering module stores the fault recovery code detected in the processing of step c7 to the address of the alarm generation history storage table 123 specified by the value of the address storage register q as the alarm recovery history (step c10).

The structure of the alarm generation history storage table 123 is the same as that of the alarm generation history storage table 122 of the monitoring control package 101 except that the scale thereof is larger (see FIG. 9).

Through repeatedly executing the processing described above by every prescribed period, the entire instant fault generation history, i.e., the fault generation notifications constituted with the fault codes corresponding to the faults recovered before the time T set in advances passes, out of the faults generated in the devices 102a, 102b, - - - and the entire instant fault recovery history, i.e., the fault recovery notifications constituted with the fault recovery codes corresponding to the recovery of those faults as well as the entire fault generation notifications constituted with the fault codes corresponding to the faults that are not recovered even after the time T set in advance passes (see FIG. 8). In the meantime, the entire fault generation notifications constituted with the fault codes corresponding to the faults that are not recovered even after the time T set in advance passes and the entire alarm recovery history, i.e., the fault recovery notifications constituted with the recovery of those faults, are stored to both the alarm generation history storage table 122 provided to the storage module 110 of the monitoring control package 101 and the alarm generation history storage table 123 (see FIG. 9) provided to the hard disk 117 of the master device 2.

To check the contents of the alarm generation history storage table 123, the operator inputs a display command to the microprocessor 112 of the master device 2 by operating the keyboard 119 and the mouse 120 of the master device 2.

The input of the display command is detected by the microprocessor 112 of the master device 2 in the judging processing of step c11 shown in FIG. 7. The microprocessor 112 functioning as a data display control module reads out the data of the alarm generation history storage table 123 in the hard disk 117, and displays the contents thereof, i.e., the entire alarm generation history, i.e., the fault generation notifications constituted with the fault codes corresponding to the faults that are not recovered even after the time T set in advance passes and the alarm recovery history, i.e., the fault recovery notifications constituted with the fault recovery codes corresponding to recovery of the faults, to the monitor 121 as in FIG. 9, for example (step c12).

Further, to check the contents of the instant fault generation history storage table 124, the operator inputs a detailed display command to the microprocessor 112 of the master device 2 by operating the keyboard 119 and the mouse 120 of the master device 2.

The input of the detail display command is detected by the microprocessor 112 of the master device 2 in the judging processing of step c13 shown in FIG. 7. The microprocessor 112 functioning as the data display control module reads the data of the instant fault generation history storage table 124 from the storage module 110 of the monitoring control package 101 via the interface 116 and the outside device interface 109 or the like of the monitoring control package 101 (step c14), and displays the contents thereof, i.e., the entire instant fault generation history, i.e., the fault generation notifications constituted with the fault codes corresponding to the faults recovered before the time T set in advance passes, and the entire instant fault recovery history, i.e., the fault recovery notifications constituted with the fault recovery codes corresponding to the recovery of the faults, as well as the entire fault generation notifications constituted with the fault codes corresponding to the faults that are not recovered even after the time T set in advance passes on the monitor 121 as shown in FIG. 8, for example (step c15).

As has already been described, the fault recovery code corresponding to the fault code stored as the alarm generation history is stored only to the alarm generation history storage table 122 as the alarm recovery history in this exemplary embodiment (see FIG. 8 and FIG. 9). In a case where the same fault recovery code is also stored in a section of the instant fault recovery history in the instant fault generation history storage table 124, "A1'" is displayed instead of "-" on the first row of the right section of the chart shown in FIG. 8, for example. Further, "B" is displayed instead of "-" on the second row, and "C1'" is displayed instead of "-" on the third row.

As described above, in this exemplary embodiment, the fault generation notification of the fault solved instantly (instant fault generation history) and the fault recovery notification (instant fault recovery history) related thereto are saved in the instant fault generation history storage table 124 provided to the storage module 110 of the monitoring control package 101 without being omitted. Thus, the operator can display the contents of the instant fault generation history storage table 124 on the monitor 121 of the master device 2 as necessary, so that it is possible to pursue the cause of the fault that generates the data error and the like and perform recovery works and the like accurately based on the instant fault generation history and the instant fault recovery history. Further, the fault generation notification of the fault solved instantly (instant fault generation history) and the fault recovery notification (instant fault recovery history) related thereto as well as the fault generation notification that is not recovered even after the time T set in advance passes and the fault recovery notification (alarm recovery history) related thereto can be displayed on the monitor 121 in a distinctive manner.

In addition, the cable for storing the instant fault generation history and the instant fault recovery history is separately provided from the cable for storing the alarm generation history and the alarm recovery history, so that it is possible to avoid such a circumstance that the storage region of the alarm generation history and the alarm recovery history is invaded by the instant faults that occur frequently.

As an exemplary advantage according to the invention, the fault information managing method and the fault information managing program according to the present invention are designed to store each fault generation notification transmitted from the main signal package at least to one of the storage modules provided to either the monitoring control package or the master device along a time series cyclically without exception, and to store each fault recovery notification transmitted in accordance with a detection of recovery of the fault corresponding to each of the stored fault generation notifications by corresponding to the respective stored fault generation notifications. Thus, the fault generation notification of the fault solved instantly (instant fault generation history) and the fault recovery notification related thereto (instant fault recovery history) can be saved at least to either the storage module of the monitoring control package or the storage module of the master device without being omitted.

Therefore, the operator can pursue the cause of the fault that generates the data error and the like and perform recovery works and the like accurately based on the instant fault generation history and the instant fault recovery history.

Figure 11:
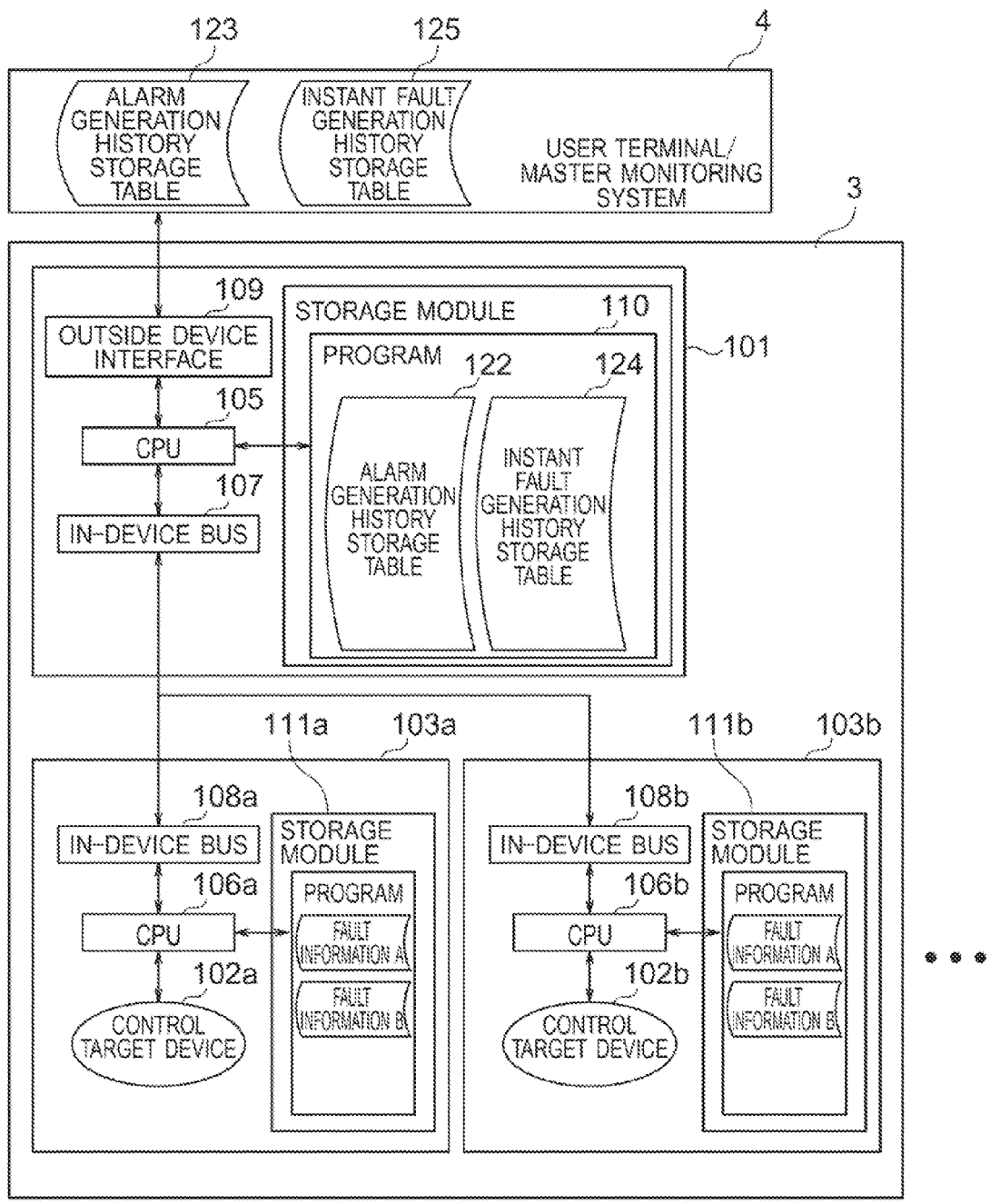
FIG. 11 is a functional block showing simplified illustrations of a trunk transmission device and its master device of another exemplary embodiment to which the fault information managing method and the fault information managing program according to the present invention are applied.

FIG. 11 is a functional block showing simplified illustrations of a trunk transmission device 3 and its master device 4 of another exemplary embodiment to which the fault information managing method and the fault information managing program according to the present invention are applied.

The structure of the hardware of the trunk transmission device 3 shown in FIG. 11 is the same as that of the trunk transmission device 1 shown in FIG. 1, and the structure of the hardware of the master device 4 shown in FIG. 11 is the same as that of the master device 2 shown in FIG. 1 as well as the master device 104 shown in FIG. 14. The difference with respect to the exemplary embodiment shown in FIG. 1 is that an instant fault generation history storage table 125 is provided to the hard disk 117 that is the storage module of the master device 4 in addition to the alarm generation history storage table 123.

In this exemplary embodiment, the microprocessor 105 of the monitoring control package 101 is driven to function as: an instant fault generation history registering/transferring module which stores each of fault generation notifications, i.e., each of the combinations of the package names and the fault codes, transmitted from the microprocessors 106a, 106b, - - - of the main signal packages 103a, 103b, - - - to the instant fault generation history storage table 124 provided to the storage module 110 of the monitoring control package 101 as an instant fault generation history along a time series cyclically without exception, and transfers the fault generation notifications to the master device 4 as the instant fault generation history; a measuring module which measures a passage time from the point at which each instant fault generation history is stored to the instant fault generation history table 124 by each instant fault generation history; an instant fault recovery history registering/transferring module which, when a fault recovery notification, i.e., a combination of the package name and the fault code, transmitted from the microprocessors 106a, 106b, - - - of the main signal packages 103a, 103b, - - - in accordance with a detection of recovery of the fault corresponding to the fault generation notification is detected before the passage time measured by the measuring module reaches the time T set in advance, stores the fault recovery notification to the instant fault generation history storage table 124 as an instant fault recovery history by corresponding to the instant fault generation history already stored in the instant fault generation history storage table 124 that is provided to the storage module 110 of the monitoring control package 101, and transfers the fault recovery notification to the master device 4 as the instant fault recovery history; an alarm generation history registering/transferring module which, when a fault recovery notification transmitted from the microprocessors 106a, 106b, - - - of the main signal packages 103a, 103b, - - - in accordance with a detection of recovery of the fault corresponding to the fault generation notification is not detected even after the passage time measured by the measuring module reaches the time T set in advance, stores the fault generation notification to an alarm generation history storage table 122 provided to the storage module 110 of the monitoring control package 101 as an alarm generation history, and transfers the fault generation notification as an alarm generation history to the master device 4; and an alarm recovery history registering/transferring module which stores a fault recovery notification transmitted from the microprocessors 106a, 106b, - - - of the main signal packages 103a, 103b, - - - in accordance with a detection of recovery of the fault corresponding to the fault generation notification to the alarm generation history storage table 122 as an alarm recovery history by corresponding to the alarm generation history already stored to the alarm generation history storage table 122 provided to the storage module 110 of the monitoring control package 101, and transfers the fault recovery notification to the master device 4 as the alarm recovery history.

Further, the microprocessor 112 of the master device 4 is driven to function as: an instant fault generation history registering module which stores the fault generation notification received as the instant fault generation history from the monitoring control package 101 to the instant fault generation history storage table 125 provided to the hard disk 117 of the master device 4 as the instant fault generation history; an instant fault recovery history registering module which stores the fault recovery notification received as the instant fault recovery history from the monitoring control package 101 to the instant fault generation storage table 125 as the instant fault recovery history by corresponding to the fault generation notification stored already in the instant fault generation history storage table 125 provided to the hard disk 117 of the master device 4 as the instant fault history; an alarm generation history registering module which stores the fault generation notification received as the alarm generation history from the monitoring control package 101 to the alarm generation history storage table 123 provided to the hard disk 117 of the master device 4 as the alarm generation history; and an alarm recovery history registering module which stores the fault recovery notification received as the alarm recovery history from the monitoring control package 101 to the alarm generation history storage table 123 as the alarm recovery history by corresponding to the fault generation notification stored already in the alarm generation history storage table 123 provided to the hard disk 117 of the master device 4 as the alarm recovery history.

When such structure is employed, the communication amount between the trunk transmission device 3 and the master device 4 for transmitting the instant fault generation history and the instant fault recovery history is increased compared to the case of the exemplary embodiment described at first. However, it is possible to achieve the same operations and effects as those of the exemplary embodiment described at first through securing the communication band sufficiently.

Further, since it is possible to display the data of the instant fault generation history storage table 125 on the monitor 121 steadily and to rewrite the display on the monitor 121 every time the data of the instant fault generation history storage table 125 is rewritten, the operator can perform maintenance promptly by checking the generation state of instant faults in real time.

The monitoring control package program for causing the microprocessor 105 of the monitoring control package 101 to function as the instant fault generation history registering/transferring module, the measuring module, the instant fault recovery history registering/transferring module, the alarm generation history registering/transferring module, and the alarm recovery history registering/transferring module as well as the master device program for causing the microprocessor 112 of the master device 4 to function as the instant fault generation history registering module, the instant fault recovery history registering module, the alarm generation history registering module, and the alarm recovery history registering module can be easily achieved by modifying the monitoring control package program shown in FIG. 3 to FIG. 5 and the master device program shown in FIG. 6 to FIG. 7, so that detailed explanations related to the programs are omitted.

Figure 12:
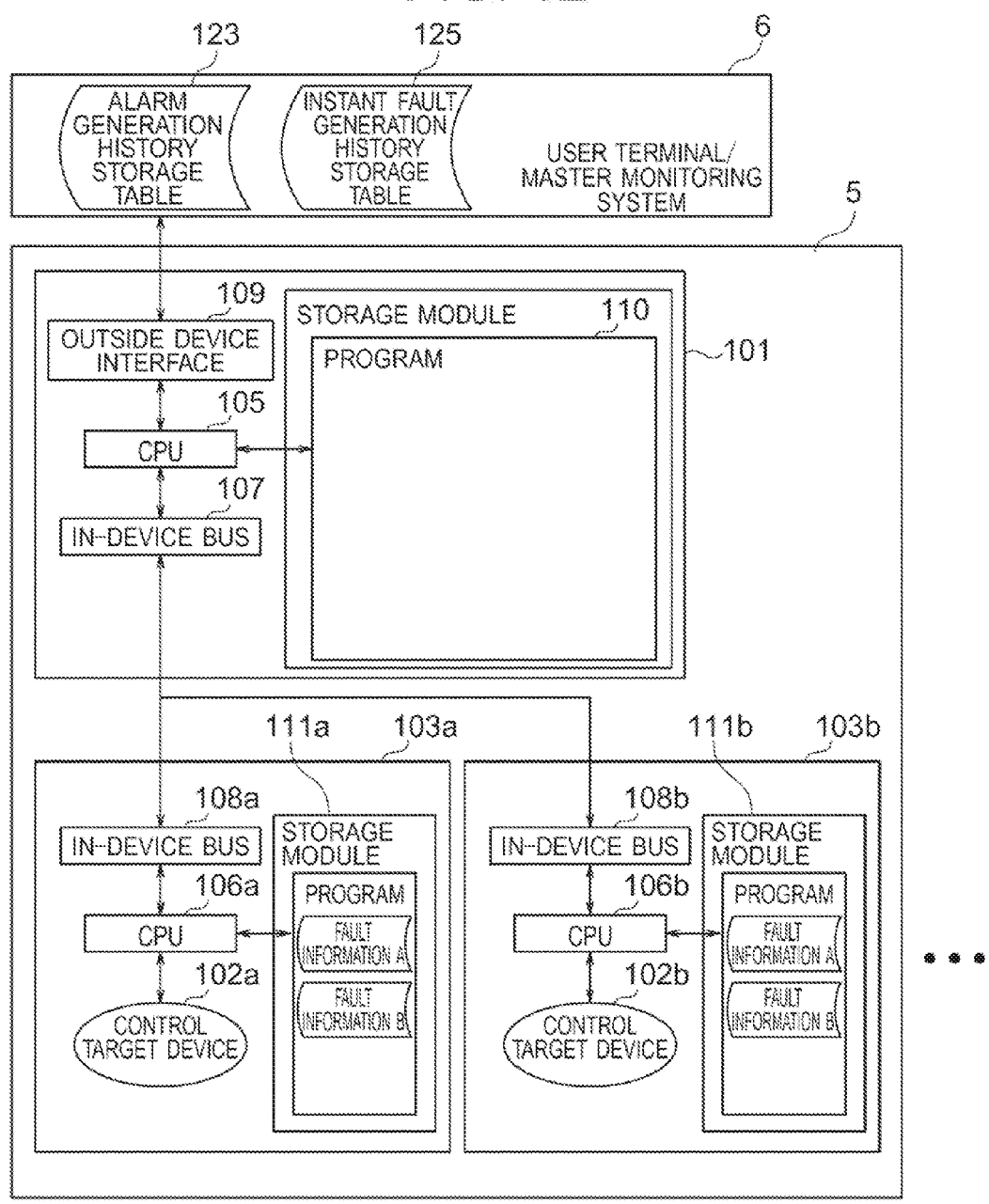
FIG. 12 is a functional block showing simplified illustrations of a trunk transmission device and its master device of still another exemplary embodiment to which the fault information managing method and the fault information managing program according to the present invention are applied.
Figure 13:
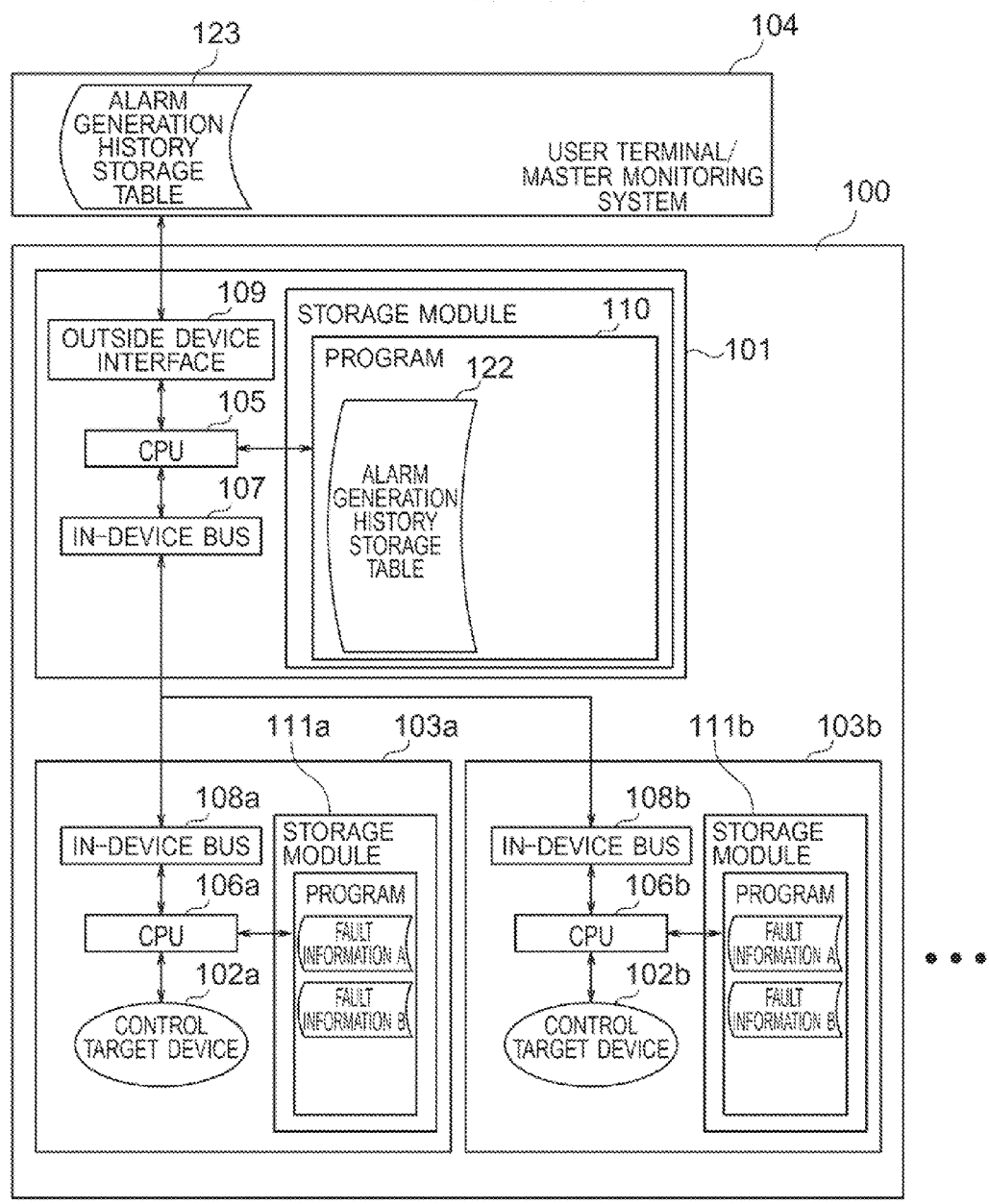
FIG. 13 is a functional block showing simplified illustrations of a well-known trunk transmission device and its master device.

FIG. 12 is a functional block showing simplified illustrations of a trunk transmission device 5 and its master device 6 of still another exemplary embodiment to which the fault information managing method and the fault information managing program according to the present invention are applied.

The structure of the hardware of the trunk transmission device 5 shown in FIG. 12 is the same as the case of the trunk transmission device 1 shown in FIG. 1 and the structure of the hardware of the master device 6 shown in FIG. 12 is the same as the case of the master device 2 shown in FIG. 1 and the master device 104 shown in FIG. 14. However, there is a difference with respect to the exemplary embodiments shown in FIG. 1 and FIG. 11 in respect that the alarm generation history storage table 123 and the instant fault generation history table 125 are provided in the hard disk 117 that is the storage module of the master device 6, and that the instant fault generation history storage table 124 and the alarm generation history storage table 122 of the monitoring control package 101 are omitted.

In this exemplary embodiment, the microprocessor 105 of the monitoring control package 101 is driven to function as: a fault generation notification transferring module which transfers the fault generation notifications, i.e., each of the combinations of the package names and the fault codes, transmitted from the microprocessors 106a, 106b, - - - of the main signal packages 103a, 103b, - - - to the master device 6 along a time series without exception; and a fault recovery notification transferring module which transfers the fault recovery notifications, i.e., each of the combinations of the package names and the fault recovery codes, transmitted from the microprocessors 106a, 106b, - - - of the main signal packages 103a, 103b, - - - in accordance with detection of recovery of the fault corresponding to each fault generation notification to the master device 6 along a time series without exception.

Further, the microprocessor 112 of the master device 6 is driven to function as: an instant fault generation history registering module which stores each of fault generation notifications transmitted from the microprocessors 106a, 106b, - - - of the main signal packages 103a, 103b, - - - to the instant fault generation history storage table 125 provided to the hard disk 117 of the master device 6 as an instant fault generation history along a time series cyclically without exception; a measuring module which measures a passage time from the point at which each instant fault generation history is stored to the instant fault generation history table 125 by each instant fault generation history; an instant fault recovery history registering module which, when a fault recovery notification transmitted from the microprocessors 106a, 106b, - - - of the main signal packages 103a, 103b, - - - in accordance with a detection of recovery of the fault corresponding to the fault generation notification is detected before the passage time measured by the measuring module reaches the time T set in advance, stores the fault recovery notification to the instant fault generation history storage table 125 provided to the hard disk 117 of the master device 6 as an instant fault recovery history by corresponding to the instant fault generation history already stored in the instant fault generation history storage table 125; an alarm generation history registering module which, when a fault recovery notification transmitted from the microprocessors 106a, 106b, - - - of the main signal packages 103a, 103b, - - - in accordance with a detection of recovery of the fault corresponding to the fault generation notification is not detected even after the passage time measured by the measuring module reaches the time T set in advance, stores the fault generation notification to an alarm generation history storage table 123 provided to the hard disk 117 of the master device 6 as an alarm generation history; and an alarm recovery history registering module which stores a fault recovery notification transmitted from the microprocessors 106a, 106b, - - - of the main signal packages 103a, 103b, - - - in accordance with a detection of recovery of the fault corresponding to the fault generation notification to the alarm generation history storage table 123 provided to the hard disk 117 of the master device 6 as an alarm recovery history by corresponding to the alarm generation history already stored to the alarm generation history storage table 123.

When such structure is employed, the communication amount between the trunk transmission device 5 and the master device 6 for transmitting the instant fault generation history and the instant fault recovery history is also increased compared to the case of the exemplary embodiment described at first. However, it is possible to achieve the same operations and effects as those of the exemplary embodiment described at first through securing the communication band sufficiently.

Further, since it is possible to display the data of the instant fault generation history storage table 125 on the monitor 121 steadily and to rewrite the display on the monitor 121 every time the data of the instant fault generation history storage table 125 is rewritten, the operator can perform maintenance promptly by checking the generation state of instant faults in real time.

In addition, it is unnecessary to provide the instant fault generation history storage table and the alarm generation history storage table within the monitoring control package 101. Therefore, the required storage capacity of the storage module 110 of the monitoring control package 101 is very small, so that the production cost of the monitoring control package 101 can be decreased. The monitoring control package program for causing the microprocessor 105 of the monitoring control package 101 to function as the fault generation notification transferring module and the fault recovery notification transferring module as well as the master device program for causing the microprocessor 112 of the master device 6 to function as the instant fault generation history registering module, the measuring module, the instant fault recovery history registering module, the alarm generation history registering module, and the alarm recovery history registering module can be easily achieved by modifying the monitoring control package program shown in FIG. 3 to FIG. 5 and the master device program shown in FIG. 6 to FIG. 7, so that detailed explanations related to the programs are omitted.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part of or a whole part of the exemplary embodiments disclosed above can be expressed appropriately by the contents depicted in following Supplementary Notes. However, it is to be noted that the modes for carrying out the present invention and the technical spirit of the present invention are not limited to those contents.

(Supplementary Note 1)

A fault information managing method of a trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device, and the method includes:

storing each of the fault generation notifications transmitted from each of the main signal packages at least to a storage module provided at least either to the monitoring control package or to the master device along a time series cyclically without exception; and storing each of the fault recovery notifications transmitted in accordance with a detection of recovery of the fault corresponding to each of already stored fault generation notifications to the storage module by corresponding to each of the already stored fault generation notifications.

(Supplementary Note 2)

The fault information managing method of the trunk transmission device as depicted in claim Supplementary Note 1, which is characterized to include:

storing each of the fault generation notifications to an instant fault generation history storage table provided to the storage module as an instant fault generation history along a time series cyclically without exception, measuring a passage time from a point at which each of the instant fault generation histories is stored by each of the instant fault generation histories, and when a fault recovery notification transmitted in accordance with a detection of recovery of the fault corresponding to the fault generation notification is detected before the passage time reaches a time set in advance, storing the fault recovery notification as an instant fault recovery history by corresponding to the instant fault generation history already stored to the instant fault generation history storage table; and when the fault recovery notification transmitted in accordance with a detection of recovery of the fault corresponding to the fault generation notification is not detected even after the passage time from a point at which the instant fault generation history is stored reaches the time set in advance, storing the fault generation notification to an alarm generation history storage table provided to the storage module as an alarm generation history, and storing the fault recovery notification transmitted in accordance with a detection of recovery of the fault corresponding to the fault generation notification as an alarm recovery history by corresponding to the alarm generation history already stored to the alarm generation history storage table.

(Supplementary Note 3)

The fault information managing method of the trunk transmission device as depicted in Supplementary Note 1 or 2, which is characterized to include:

storing each of the fault generation notifications to the instant fault generation history storage table provided to the storage module of the monitoring control package as the instant fault generation history along a time series cyclically without exception, measuring a passage time from a point at which each of the instant fault generation histories is stored by each of the instant fault generation histories, and when the fault recovery notification transmitted in accordance with a detection of recovery of the fault corresponding to the fault generation notification is detected before the passage time reaches the time set in advance, storing the fault recovery notification as the instant fault recovery history by corresponding to the instant fault generation history already stored to the instant fault generation history storage table provided to the storage module of the monitoring control package; and when the fault recovery notification transmitted in accordance with a detection of recovery of the fault corresponding to the fault generation notification is not detected even after the passage time from a point at which the instant fault generation history is stored reaches the time set in advance, storing the fault generation notification to the alarm generation history storage table provided to the storage module of the monitoring control package and to the alarm generation history storage table provided to the master device as an alarm generation history, and storing the fault recovery notification transmitted in accordance with a detection of recovery of the fault corresponding to the fault generation notification as the alarm recovery history by corresponding to the alarm generation history already stored to the alarm generation history storage table provided to the storage module of the monitoring control package and the alarm generation history storage table provided to the storage module of the master device.

(Supplementary Note 4)

The fault information managing method of the trunk transmission device as depicted in Supplementary Note 1 or 2, which is characterized to include:

storing each of the fault generation notifications to the instant fault generation history storage table provided to the storage module of the monitoring control package and the instant fault generation history storage table provided to the storage module of the master device as the instant fault generation history along a time series cyclically without exception, measuring a passage time from a point at which each of the instant fault generation histories is stored by each of the instant fault generation histories, and when the fault recovery notification transmitted in accordance with a detection of recovery of the fault corresponding to the fault generation notification is detected before the passage time reaches the time set in advance, storing the fault recovery notification as the instant fault recovery history by corresponding to the instant fault generation history already stored to the instant fault generation history storage table provided to the storage module of the monitoring control package and to the instant fault generation history storage table provided to the storage module of the master device; and when the fault recovery notification transmitted in accordance with a detection of recovery of the fault corresponding to the fault generation notification is not detected even after the passage time from a point at which the instant fault generation history is stored reaches the time set in advance, storing the fault generation notification to the alarm generation history storage table provided to the storage module of the monitoring control package and to the alarm generation history storage table provided to the storage module of the master device as an alarm generation history, and storing the fault recovery notification transmitted in accordance with a detection of recovery of the fault corresponding to the fault generation notification as the alarm recovery history by corresponding to the alarm generation history already stored to the alarm generation history storage table provided to the storage module of the monitoring control package and the alarm generation history storage table provided to the storage module of the master device.

(Supplementary Note 5)

The fault information managing method of the trunk transmission device as depicted in Supplementary Note 1 or 2, which is characterized to include:

storing each of the fault generation notifications to the instant fault generation history storage table provided to the storage module of the master device as the instant fault generation history along a time series cyclically without exception, measuring a passage time from a point at which each of the instant fault generation histories is stored by each of the instant fault generation histories, and when the fault recovery notification transmitted in accordance with a detection of recovery of the fault corresponding to the fault generation notification is detected before the passage time reaches the time set in advance, storing the fault recovery notification as the instant fault recovery history by corresponding to the instant fault generation history already stored to the instant fault generation history storage table provided to the storage module of the master device; and when the fault recovery notification transmitted in accordance with a detection of recovery of the fault corresponding to the fault generation notification is not detected even after the passage time from a point at which the instant fault generation history is stored reaches a time set in advance, storing the fault generation notification to the alarm generation history storage table provided to the storage module of the master device as the alarm generation history, and storing the fault recovery notification transmitted in accordance with a detection of recovery of the fault corresponding to the fault generation notification as the alarm recovery history by corresponding to the alarm generation history already stored to the alarm generation history storage table provided to the master device.

(Supplementary Note 6)

A non-transitory computer readable recording medium storing a fault information managing program of a trunk transmission device which includes main signal packages for each device for detecting a fault generated in each device and recovery of the fault and transmitting a fault generation notification and a fault recovery notification to a monitoring control package, and includes the monitoring control package for receiving the fault generation notification and the fault recovery notification from each of the main signal packages and transmitting at least a part thereof to a master device, and the program is structured to include a monitoring control package program which causes a microprocessor of the monitoring control package to function as: an instant fault generation history registering module which stores each of the fault generation notifications to an instant fault generation history storage table provided to a storage module of the monitoring control package as an instant fault generation history along a time series cyclically without exception; a measuring module which measures a passage time from a point at which each instant fault generation history is stored by each instant fault generation history; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification to the master device; and an alarm recovery history registering/transferring module which stores a fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package, and transfers the fault recovery notification to the master device, and a master device program which causes a microprocessor of the master device to function as an alarm generation history registering module which stores the fault generation notification received from the monitoring control package to an alarm generation history storage table provided to the master device as an alarm generation history, and an alarm recovery history registering module which stores the fault recovery notification received from the monitoring control package to the alarm generation history storage table provided to the master device as an alarm recovery history.

(Supplementary Note 7)

A non-transitory computer readable recording medium storing a fault information managing program of a trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device, and the program is structured to include a monitoring control package program which causes a microprocessor of the monitoring control package to function as: an instant fault generation history registering/transferring module which stores each of the fault generation notifications to an instant fault generation history storage table provided to a storage module of the monitoring control package as an instant fault generation history along a time series cyclically without exception and transfers the fault generation notification to the master device as the instant fault generation history; a measuring module which measures a passage time from a point at which each instant fault generation history is stored by each instant fault generation history; an instant fault recovery history registering/transferring module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package and transfers the fault recovery notification to the master device as the instant fault recovery history; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification to the master device as the alarm generation history; and an alarm recovery history registering/transferring module which stores the fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package and transfers the fault recovery notification to the master device as the alarm recovery history, and a master device program which causes a microprocessor of the master device to function as: an instant fault generation history registering module which stores the fault generation notification received as the instant fault generation history from the monitoring control package to an instant fault generation history storage table provided to the master device as the instant fault generation history; an instant fault recovery history registering module which stores the fault recovery notification received as the instant fault recovery history from the monitoring control package as the instant fault recovery history by corresponding to the instant fault generation history already stored to the instant fault generation history storage table provided to the master device as the instant fault recovery history; an alarm generation history registering module which stores the fault generation notification received as the alarm generation history from the monitoring control package to an alarm generation history storage table provided to the master device as an alarm generation history; and an alarm recovery history registering module which stores the fault recovery notification received as the alarm recovery history from the monitoring control package by corresponding to the alarm generation history already stored to the alarm generation history storage table provided to the master device as the alarm recovery history.

(Supplementary Note 8)

A non-transitory computer readable recording medium storing a fault information managing program of a trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device, and the program is structured to include a monitoring control package program which causes a microprocessor of the monitoring control package to function as: a fault generation notification transferring module which transfers each of the fault generation notifications transmitted from each of the main signal packages to the master device along a time series without exception; and a fault recovery notification transferring module which transfers each of the fault recovery notifications transmitted from each of the main signal packages in accordance with a detection of recovery of the fault corresponding to the fault generation notification to the master device along a time series without exception, and a master device program which causes a microprocessor of the master device to function as: an instant fault generation history registering module which stores each of the fault generation notifications to an instant fault generation history storage table provided to a storage module of the master device as an instant fault generation history along a time series cyclically without exception; a measuring module which measures a passage time from a point at which each instant fault generation history is stored by each instant fault generation history; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the master device; an alarm generation history registering module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the master device as an alarm generation history; and an alarm recovery history registering module which stores the fault recovery notification transmitted in accordance with a detection of recovery of the fault corresponding to the fault generation notification as an alarm recovery history by corresponding to the alarm generation history already stored to the alarm generation history storage table provided to the storage module of the master device.

(Supplementary Note 9)

A trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device, wherein the monitor control package includes: an instant fault generation history registering module which stores each of the fault generation notifications to an instant fault generation history storage table provided to a storage module of the monitoring control package as an instant fault generation history along a time series cyclically without exception; a measuring module which measures a passage time from a point at which each instant fault generation history is stored by each instant fault generation history; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification as an alarm generation history to the master device; and an alarm recovery history registering/transferring module which stores a fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package, and transfers the fault recovery notification to the master device.

(Supplementary Note 10)

A trunk transmission device which includes main signal packages for each device for detecting a fault generated in each device and recovery of the fault and transmitting a fault generation notification and a fault recovery notification to a monitoring control package and includes the monitoring control package for receiving the fault generation notification and the fault recovery notification from each of the main signal packages and transmitting at least a part thereof to a master device, wherein the monitor control package includes: an instant fault generation history registering/transferring module which stores each of the fault generation notifications to an instant fault generation history storage table provided to a storage module of the monitoring control package as an instant fault generation history along a time series cyclically without exception and transfers the fault generation notification to the master device as the instant fault generation history; a measuring module which measures a passage time from a point at which each instant fault generation history is stored by each instant fault generation history; an instant fault recovery history registering/transferring module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package and transfers the fault recovery notification to the master device as the instant fault recovery history; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification to the master device as the alarm generation history; and an alarm recovery history registering/transferring module which stores the fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package and transfers the fault recovery notification to the master device as the alarm recovery history.

INDUSTRIAL APPLICABILITY

The present invention can be applied to a trunk transmission device which includes: main signal packages provided to each of devices which transmit a fault generation notification and a fault recovery notification to a monitoring control package by detecting a fault generated in the devices and recovery of the fault; and the monitoring control package which receives the fault generation notification and the fault recovery notification from each of the main signal control packages, and transmits at least a part thereof to a master device.

What is claimed is:

1. A fault information managing method of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the method comprising:
   storing each of the fault generation notifications transmitted from each of the main signal packages at least to a storage module provided at least either to the monitoring control package or to the master device along a time series cyclically without exception; and
   storing each of the fault recovery notifications transmitted in accordance with a detection of recovery of the fault corresponding to each of already stored fault generation notifications to the storage module by corresponding to each of the already stored fault generation notifications, wherein the fault information managing method further comprises:
   storing each of the fault generation notifications to an instant fault generation history storage table provided to the storage module as an instant fault generation history along a time series cyclically without exception, measuring a passage time from a point at which each of the instant fault generation histories is stored by each of an instant fault generation histories module, and when a fault recovery notification transmitted in accordance with a detection of recovery of the fault corresponding to the fault generation notification is detected before the passage time reaches a time set in advance, storing the fault recovery notification as an instant fault recovery history by corresponding to the instant fault generation history already stored to the instant fault generation history storage table; and
   when the fault recovery notification transmitted in accordance with a detection of recovery of the fault corresponding to the fault generation notification is not detected even after the passage time from a point at which the instant fault generation history is stored reaches the time set in advance, storing the fault generation notification to an alarm generation history storage table provided to the storage module as an alarm generation history, and storing the fault recovery notification transmitted in accordance with a detection of recovery of the fault corresponding to the fault generation notification as an alarm recovery history by corresponding to the alarm generation history already stored to the alarm generation history storage table.

2. A fault information managing method of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the method comprising:
   storing each of the fault generation notifications transmitted from each of the main signal packages at least to a storage module provided at least either to the monitoring control package or to the master device along a time series cyclically without exception; and
   storing each of the fault recovery notifications transmitted in accordance with a detection of recovery of the fault corresponding to each of already stored fault generation notifications to the storage module by corresponding to each of the already stored fault generation notifications, wherein the fault information managing method further comprises:
   storing each of the fault generation notifications to an instant fault generation history storage table provided to the storage module of the monitoring control package as an instant fault generation history along a time series cyclically without exception, measuring a passage time from a point at which each of the instant fault generation histories is stored by each of an instant fault generation histories module, and when the fault recovery notification transmitted in accordance with a detection of recovery of the fault corresponding to the fault generation notification is detected before the passage time reaches a time set in advance, storing the fault recovery notification as an instant fault recovery history by corresponding to the instant fault generation history already stored to the instant fault generation history storage table provided to the storage module of the monitoring control package; and
   when the fault recovery notification transmitted in accordance with a detection of recovery of the fault corresponding to the fault generation notification is not detected even after the passage time from a point at which the instant fault generation history is stored reaches the time set in advance, storing the fault generation notification to an alarm generation history storage table provided to the storage module of the monitoring control package and to an alarm generation history storage table provided to the master device as an alarm generation history, and storing the fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package and the alarm generation history storage table provided to the storage module of the master device.

3. A fault information managing method of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the method comprising:

storing each of the fault generation notifications transmitted from each of the main signal packages at least to a storage module provided at least either to the monitoring control package or to the master device along a time series cyclically without exception; and storing each of the fault recovery notifications transmitted in accordance with a detection of recovery of the fault corresponding to each of already stored fault generation notifications to the storage module by corresponding to each of the already stored fault generation notifications, wherein the fault information managing method further comprises:

storing each of the fault generation notifications to an instant fault generation history storage table provided to the storage module of the monitoring control package and an instant fault generation history storage table provided to the storage module of the master device as an instant fault generation history along a time series cyclically without exception, measuring a passage time from a point at which each of the instant fault generation histories is stored by each of an instant fault generation histories module, and when the fault recovery notification transmitted in accordance with a detection of recovery of the fault corresponding to the fault generation notification is detected before the passage time reaches a time set in advance, storing the fault recovery notification as an instant fault recovery history by corresponding to the instant fault generation history already stored to the instant fault generation history storage table provided to the storage module of the monitoring control package and to the instant fault generation history storage table provided to the storage module of the master device; and when the fault recovery notification transmitted in accordance with a detection of recovery of the fault corresponding to the fault generation notification is not detected even after the passage time from a point at which the instant fault generation history is stored reaches the time set in advance, storing the fault generation notification to an alarm generation history storage table provided to the storage module of the monitoring control package and to an alarm generation history storage table provided to the storage module of the master device as an alarm generation history, and storing the fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package and the alarm generation history storage table provided to the storage module of the master device.

4. A fault information managing method of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the method comprising:

storing each of the fault generation notifications transmitted from each of the main signal packages at least to a storage module provided at least either to the monitoring control package or to the master device along a time series cyclically without exception; and storing each of the fault recovery notifications transmitted in accordance with a detection of recovery of the fault corresponding to each of already stored fault generation notifications to the storage module by corresponding to each of the already stored fault generation notifications, wherein the fault information managing method further comprises:

storing each of the fault generation notifications to an instant fault generation history storage table provided to the storage module of the master device as an instant fault generation history along a time series cyclically without exception, measuring a passage time from a point at which each of the instant fault generation histories is stored by each of an instant fault generation histories module, and when the fault recovery notification transmitted in accordance with a detection of recovery of the fault corresponding to the fault generation notification is detected before the passage time reaches a time set in advance, storing the fault recovery notification as an instant fault recovery history by corresponding to the instant fault generation history already stored to the instant fault generation history storage table provided to the storage module of the master device; and when the fault recovery notification transmitted in accordance with a detection of recovery of the fault corresponding to the fault generation notification is not detected even after the passage time from a point at which the instant fault generation history is stored reaches a time set in advance, storing the fault generation notification to an alarm generation history storage table provided to the storage module of the master device as an alarm generation history, and storing the fault recovery notification transmitted in accordance with a detection of recovery of the fault corresponding to the fault generation notification as an alarm recovery history by corresponding to the alarm generation history already stored to the alarm generation history storage table provided to the master device.

5. A non-transitory computer readable recording medium storing a fault information managing program of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the program comprising a monitoring control package program which causes a microprocessor of the monitoring control package to function as: an instant fault generation history registering module which stores each of the fault generation notifications to an instant fault generation history storage table provided to a storage module of the monitoring control package as an instant fault generation history along a time series cyclically without exception; a measuring module which measures a passage time from a point at which each instant fault generation history is stored by each instant fault generation history module; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification to the master device; and an alarm recovery history registering/transferring module which stores a fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package, and transfers the fault recovery notification to the master device, and a master device program which causes a microprocessor of the master device to function as an alarm generation history registering module which stores the fault generation notification received from the monitoring control package to an alarm generation history storage table provided to the master device as an alarm generation history, and an alarm recovery history registering module which stores the fault recovery notification received from the monitoring control package to the alarm generation history storage table provided to the master device as an alarm recovery history.

6. A non-transitory computer readable recording medium storing a fault information managing program of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the program comprising a monitoring control package program which causes a microprocessor of the monitoring control package to function as: an instant fault generation history registering/transferring module which stores each of the fault generation notifications to an instant fault generation history storage table provided to a storage module of the monitoring control package as an instant fault generation history along a time series cyclically without exception and transfers the fault generation notifications to the master device as instant fault generation histories; a measuring module which measures a passage time from a point at which each instant fault generation history is stored by an instant fault generation history module; an instant fault recovery history registering/transferring module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the monitoring control package and transfers the fault recovery notification to the master device as the instant fault recovery history; an alarm generation history registering/transferring module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the monitoring control package as an alarm generation history and transfers the fault generation notification to the master device as the alarm generation history; and an alarm recovery history registering/transferring module which stores the fault recovery notification transmitted in accordance with a detection of recovery of the fault corresponding to the fault generation notification as an alarm recovery history by corresponding to the alarm generation history already stored to the alarm generation history storage table provided to the storage module of the monitoring control package and transfers the fault recovery notification to the master device as the alarm recovery history, and a master device program which causes a microprocessor of the master device to function as: an instant fault generation history registering module which stores the fault generation notification received as the instant fault generation history from the monitoring control package to an instant fault generation history storage table provided to the master device as the instant fault generation history; an instant fault recovery history registering module which stores the fault recovery notification received as the instant fault recovery history from the monitoring control package as the instant fault recovery history by corresponding to the instant fault generation history already stored to the instant fault generation history storage table provided to the master device as the instant fault recovery history; an alarm generation history registering module which stores the fault generation notification received as the alarm generation history from the monitoring control package to an alarm generation history storage table provided to the master device as an alarm generation history; and an alarm recovery history registering module which stores the fault recovery notification received as the alarm recovery history from the monitoring control package by corresponding to the alarm generation history already stored to the alarm generation history storage table provided to the master device as the alarm recovery history.

7. A non-transitory computer readable recording medium storing a fault information managing program of a trunk transmission device which comprises main signal packages for each device for detecting a fault generated in each device and recovery of the fault and transmitting a fault generation notification and a fault recovery notification to a monitoring control package and comprises the monitoring control package for receiving the fault generation notification and the fault recovery notification from each of the main signal packages and transmitting at least a part thereof to a master device, the program comprising a monitoring control package program which causes a microprocessor of the monitoring control package to function as: a fault generation notification transferring module which transfers each of the fault generation notifications transmitted from each of the main signal packages to the master device along a time series without exception; and a fault recovery notification transferring module which transfers each of the fault recovery notifications transmitted from each of the main signal packages in accordance with a detection of recovery of the fault corresponding to the fault generation notification to the master device along a time series without exception, and a master device program which causes a microprocessor of the master device to function as: an instant fault generation history registering module which stores each of the fault generation notifications to an instant fault generation history storage table provided to a storage module of the master device as an instant fault generation history along a time series cyclically without exception; a measuring module which measures a passage time from a point at which each instant fault generation history is stored by each instant fault generation history module; an instant fault recovery history registering module which, when a fault recovery notification transmitted in accordance with a detection of recovery of the fault corresponding to the fault generation notification is detected before the passage time measured by the measuring module reaches a time set in advance, stores the fault recovery notification as an instant fault recovery history by corresponding to the instant fault generation history already stored to the instant fault generation history storage table provided to the storage module of the master device; an alarm generation history registering module which, when the fault recovery notification transmitted in accordance with a detection of recovery of the fault corresponding to the fault generation notification is not detected even after the passage time measured by the measuring module reaches the time set in advance, stores the fault generation notification to an alarm generation history storage table provided to the storage module of the master device as an alarm generation history; and an alarm recovery history registering module which stores the fault recovery notification transmitted in accordance with a detection of recovery of the fault corresponding to the fault generation notification as an alarm recovery history by corresponding to the alarm generation history already stored to the alarm generation history storage table provided to the storage module of the master device.

* * * * *